United States Patent [19]

Holmes

[11] Patent Number: 4,761,762
[45] Date of Patent: Aug. 2, 1988

[54] INTERRUPT CONTROL SWITCH INTERFACE SYSTEM

[75] Inventor: Buddy L. Holmes, Ocean Springs, Miss.

[73] Assignee: The United States of America as represented by the Secretary of the Air Force, Washington, D.C.

[21] Appl. No.: 849,991

[22] Filed: Apr. 10, 1986

[51] Int. Cl.[4] .............................................. G06F 3/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,892,915 | 7/1975 | Budworth et al. | 178/21 |
| 4,001,785 | 1/1977 | Miyazaki et al. | 340/172.5 |
| 4,180,860 | 12/1979 | Driscoll et al. | 364/900 |
| 4,209,841 | 6/1980 | Bambara et al. | 364/200 |
| 4,338,677 | 7/1982 | Morrill, Jr. et al. | 364/900 |
| 4,377,853 | 3/1983 | Dockal | 364/900 |
| 4,443,860 | 4/1984 | Vidalin | 364/900 |

Primary Examiner—Raulfe B. Zache
Assistant Examiner—Emily Y. Chan
Attorney, Agent, or Firm—Bernard E. Franz; Donald J. Singer

[57] ABSTRACT

Switch contacts are monitored by a computer for change of status (open or closed) without polling them. The apparatus comprises an input port module and up to eight switch reader modules, with 128 switch contacts to each. The input port module has four Z80 PIOs providing a total of eight ports for the switch reader modules, and a S-100 bus to the computer. In each switch reader module, in a RUN mode, the operation is to address the switch contacts sequentially and via a latch to load the status as data into a 128-bit shift register, and then to compare the current and previous states represented by the inputs and outputs of the shift register. If the switch contact being addressed has changed state, the comparator generates an interrupt to the processor. At the same time that an interrupt is generated, a scan inhibit command is supplied from a comparator to stop a clock. Data from an address counter and the latch are supplied via the input port module to the processor. The processor then returns a ready signal to resume the scan. There is also a LOAD mode using 512 (4×128) read operations to cycle the clock and load the 128 bits of the shift register.

5 Claims, 13 Drawing Sheets

Fig. 3  OPTO COUPLERS & MULTIPLEXERS

TIMING DIAGRAM

INTERRUPT CONTROL SWITCH INTERFACE SYSTEM

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates to an interrupt control switch interface system for use with a computer; and more particularly to a system for scanning a plurality of switch contacts to detect a change of status (open or closed) and generate an interrupt to a microcomputer, and then determine and transmit the address of the switch.

2. Description of the Related Art

The problem with using a computer to monitor switch contacts, is that the computer must take time out from its regular processing to stop and look at each switch. This is called polling. This process is time consuming, especially if there are a lot of switches.

U.S. Pat. No. 3,892,915 discloses a stenographic data recording apparatus in which the state of all keys are scanned to determine which of the various keys have been depressed with the results being stored in memory. U.S. Pat. No. 4,443,860 discloses a circuit in which data comparisons are carried out between reference logical entities and logical entities proceeding from a file. U.S. Pat. No. 4,338,677 discloses a data capture circuit for a logic state analyzer which includes a qualifier pattern comparator that responds to a collection of input qualifier signals. U.S. Pat. No. 4,001,785 discloses a scanning circuit which successively scans a multiplicity of input points and includes a comparison circuit.

SUMMARY OF THE INVENTION

An object of the invention is to provide a system for monitoring a multitude of switch contacts without polling them, to thereby increase computer efficiency.

The subject invention comprises a switch interface system which allows for monitoring of a multitude of switch contacts without polling them. The apparatus comprises an input port module and up to eight switch reader modules. The input port module has eight ports for the switch reader modules, provided by four Z80 PIO input/output IC chips coupled via a S-100 bus to a processor. Each switch reader module has inputs for a maximum of N (128) of the switch contacts coupled via optical couplers to a multiplex unit, which multiplexes the N inputs to one multiplex output. The multiplex output is the input of a latch. The output of the latch is a switch data lead, which is connected to the serial input of an N-bit shift register, to a comparator, and to a switch data lead coupled to the port for the switch reader. The comparator has a second comparison input from the output of the shift register, so that the present state and the previous state of a switch contact may be compared.

An address counter comprises a binary counter with binary output leads coupled to the port for the switch reader module. Some of the binary outputs are decoded to select a chip of the multiplex unit, and other of the binary address outputs are coupled in multiple to all of the chips of the multiplex unit to select an address on the chip.

A clock circuit of each switch reader module generates clock signals cycling repeatedly through four phases at respective outputs. The clock input is suppled via the input port module and said bus from the processor. Phase one is used to advance the address counter, phase two is used to load the latch with the multiplex output, phase three is used to enable the comparator, and phase four is used to enable the shift register.

In a RUN mode, the operation is to read a switch address via the multiplex unit on phase one, load the data into the latch on phase two, compare the current and previous states on phase three, and advances the shift register on phase four. During phase three, if the switch contact has changed state, the comparator generates a strobe pulse which is supplied to the port for the switch reader to initiate an interrupt to the processor. At the same time that a strobe pulse is generated, a scan inhibit command is supplied from the comparator to stop the clock. The scan inhibit command sets a scan count flip flop, which has an output to inhibit the clock pulses at a clock scan gate between the clock lead from the port and the clock. The strobe pulse initiates an interrupt to the processor via the input port module. The address and switch data leads suppy data to the processor via the input port module. The processor then returns a ready signal via the input port module which resets the scan count flip flop, so that the clock resumes operation to continue scanning the switch contacts.

The input pot module includes interrupt means which is actuated in response to a pulse on the strobe lead of any of its ports to set that port to an interrupt condition and to supply an interrupt signal via said bus to the processor, and to select one of the ports having the interrupt condition. The input port module includes a transceiver for repeating the data received at an input unit via the bus to the processor, and also to supply control data from the processor to a selected input unit.

The switch reader modules also have a LOAD mode. A preset lead from the processor via the input port module is used to reset the clock, the address counter, and the latch to an initial state with the address at zero. A load lockout flip flop is also set to a loading state, with outputs to a set of gates to inhibit the input from the clock lead and couple the ready lead to the clock input. The processor performs 4N read operations to advance the clock through N cycles. The load lockout flip flop also inhibits the comparator. The shift register is thereby loaded with the current state for the N switch contacts, and upon reaching address N a signal is generated by an N-count detector to reset the load lockout flip flop and place the swtich reader module in the RUN mode.

DESCRIPTION OF THE PREFERRED EMBODIMENT

Figure 1:
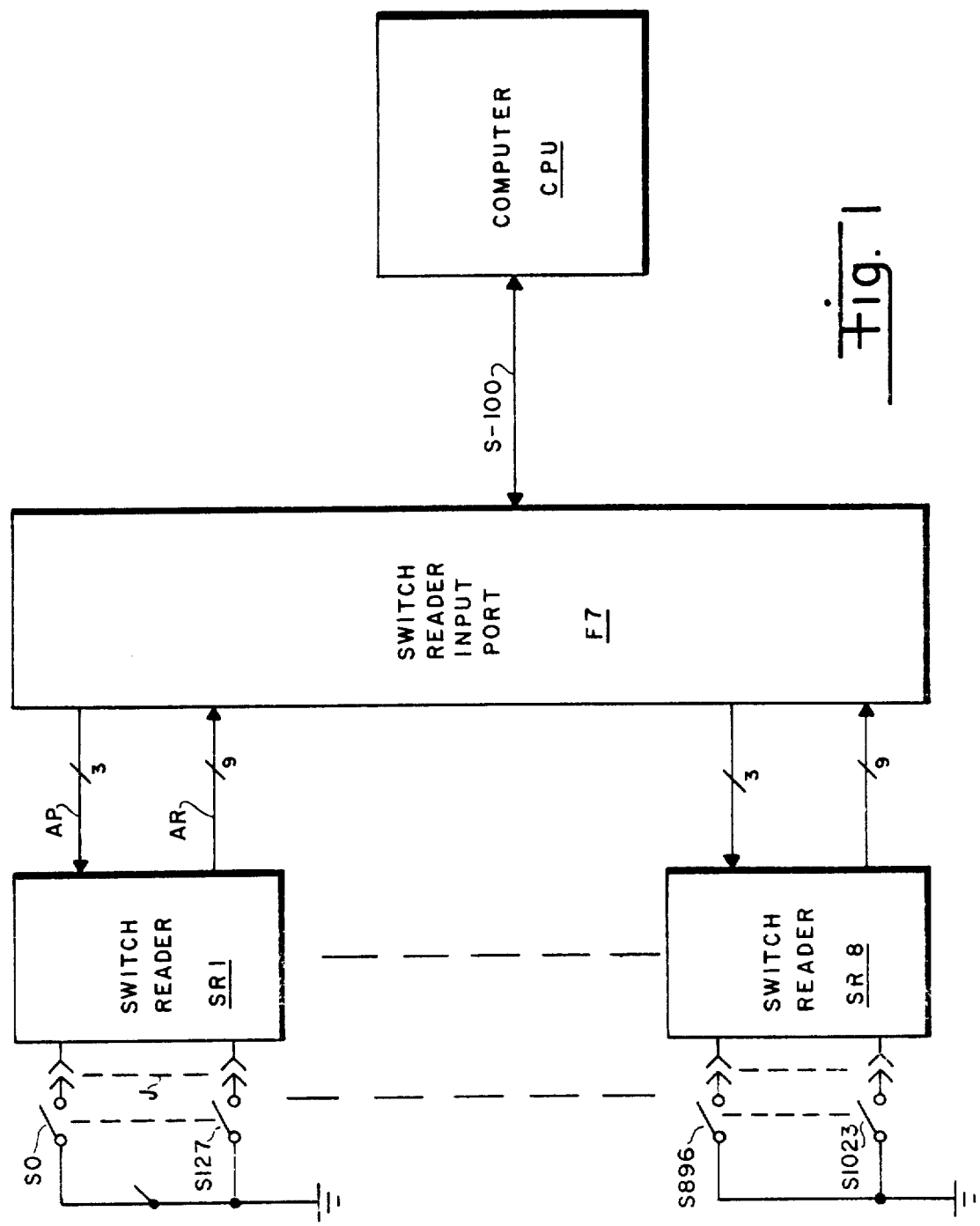
FIG. 1 is is a system block diagram.

Referring to FIG. 1, the switch reader system consists of a switch reader input port card F7 and from one to eight switch reader cards SR-1 to SR-8. The switch reader input port card F7 has input ports for eight switch reader cards. For each port, the cable between the reader and the port has leads for three signals from the port to the reader, and leads for nine signals from the reader to the port, shown for switch reader SR1 as lines AP and AR. The switch reader input port card plugs directly into the S-100 bus of a computer CPU mainframe. Each switch reader card has inputs for up to 128 switch contacts. This card plugs into an S-100 type edge connector in a card cage set up for the switch readers only. Note that the switch reader card is in no way compatible with the S-100 bus of the computer mainframe. With a total of eight switch reaader cards connected to a switch reader input port card, this configuration will form a full-blown switch reading system capable of reading 1024 switch contacts, shown as contacts S0-S127 for the switch reader card SR1, and continuing up to contacts S896-S1023 for switch reader card SR8. In the description an asterisk is used with lead designations to indicate that the signals are in inverted form for the active state. The gates and inverters are on IC chips of the 7400 series.

SWITCH READER MODULE

Figure 2:
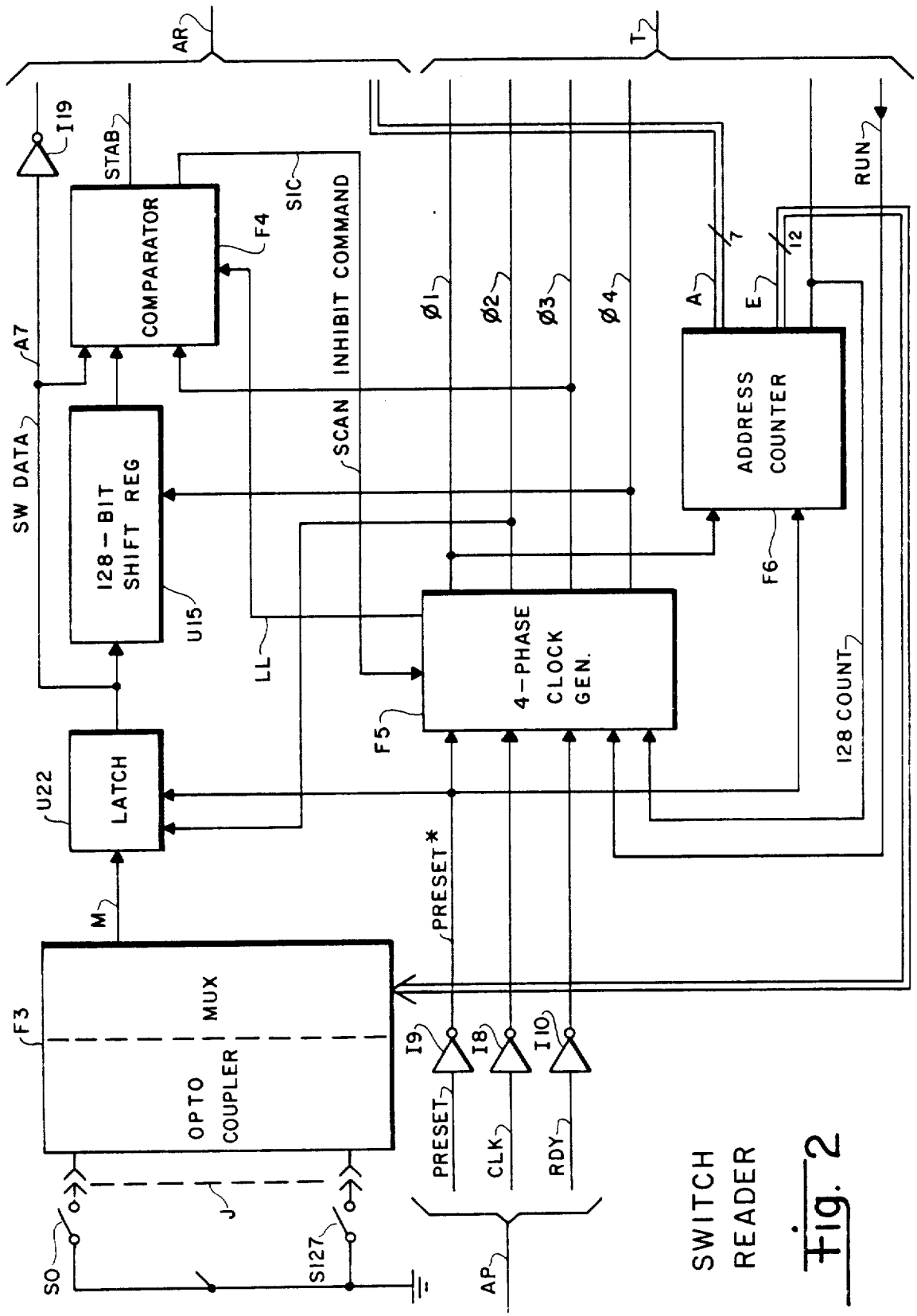
FIG. 2 is a block diagram of one switch reader of FIG. 1.

The switch reader SR1 is shown in FIG. 2 as comprising a multiplex unit F3 with optical couplers to the swtich contacts S0-S127, a latch chip U22, a 128-bit shift register chip U15, a comparator F4, a 4-phase clock generator F5, and an address counter F6. The three input leads for signals from the port card are PRESET, CLK AND RDY. The nine output leads on line AR to the port are seven leads designated line A from the address counter F6, an eighth address lead via an inverter I19 from lead A7, and a strobe signal on lead STAB from the comparator F4.

Figure 3:
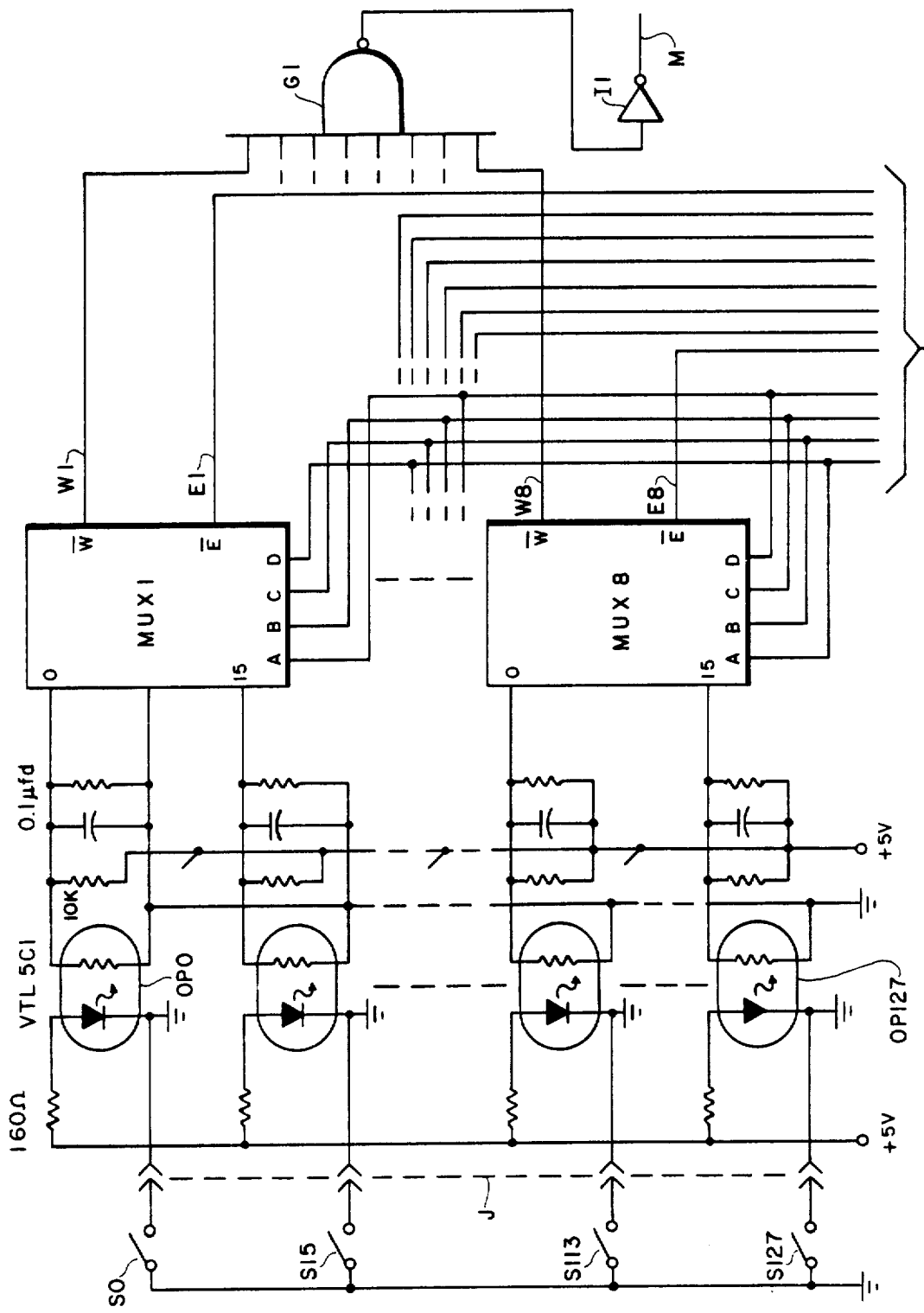
FIGS. 3–6 together comprise a more detailed functional block diagram of the circuits shown in FIG. 2.

The multiplex unit F3 is shown in FIG. 3. It comprises eight type 74C150 multiplexer chips MUX-1-MUX8. The 128 inputs from the switch contacts S0-S127 for the switch position data are coupled to the input of the MUX through type VTL5C1 opto-couplers OP0-OP127. The opto-couplers are used to enhance the switch reader capability by eliminating contact bounce from switches and extraneous outside interference. The opto-couplers provide a high transient noise immunity due to the slow rise and decay of the photo cell. Noise spikes from pickup or switch bounce will be rejected by the photo cell. Typical delay from input state change to output state change is 10 ms. Due to the transient nature of switch bounce and noise spikes, this should more than adequately eliminate them.

The switch contacts are connected to GND volts on the common side. The other side of each switch is connected through cabling and a set of jacks designated J to a 160-ohm resistor in series with the opto-coupler on the switch reader card. The 160-ohm resistor is connected to the anode of the LED with the other end to +5V and the cathode of the LED is connected to the switch. When the switch is closed, a current of 20 ma flows through the diode, which then emits light. This light is coupled to a light-sensitive resistor.

The combination of the optical coupler internal resistor, and the parallel input of the MUX with a serial 10-K resistor to +5 volts, forms a voltage divider network as shown. When the switch is open, the photo cell resistance is very high, approximately 50 meg ohms or better, and the input resistance of the MUX is very high also. Most of the voltage will be dropped across the parallel combination of opto-coupler resistor and MUX input resistance.

The minimum permissible high state input voltage is 2 volts or better for the MUX input. When the switch is closed, the LED drives the photoresistor of the opto-coupler to a very low value of approximately 400 ohms. Under these conditions, most of the voltage will be dropped across the 10-k resistor. The MUX input voltage will then transition toward ground potential. Maximum permissible low state input voltage is around 0.8 volts. A voltage from 0.8 V to ground is considered a valid low.

Each of the eight multiplex chips MUX1-MUX8 has sixteen switch inputs from the opto-couplers. The multiplex unit is addressed via the 12-conductor line E, which has eight leads E1-E8 which are connected to the enable inputs of the individual chips, and four conductors connected in multiple to inputs A, B, C & D of all of the chips. The address counter cycles through 128 addresses, with each address selecting one of the chips by a signal on one of the lines E1-E8, and an individual input by decoding in the chip of the other four signals. In this manner, a total of 128 switch input lines can be selected.

The output of each MUX is an inverted version of the input. The outputs from the eight chips on leads W1-W8 are then combined into one output by a MUX mixer gate G1, a 74C30 8-input NAND gate. This gate also inverts the signal. The signal is again inverted by inverter I1 so that a closed switch can be represented by a logic high for switch data out on lead M.

Figure 4:
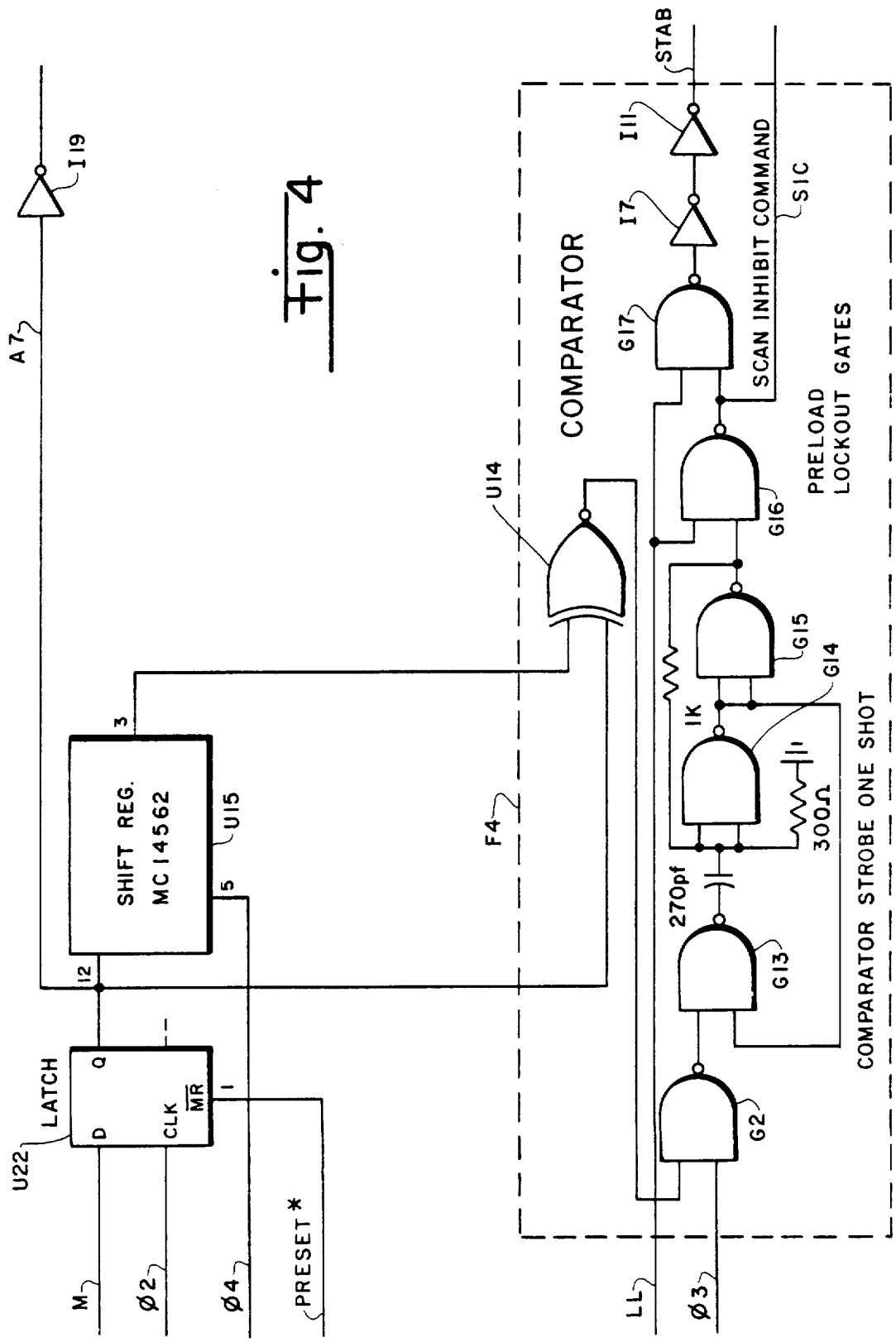

FIG. 4 shows the latch U22, the shift register U15, and the comparator F4. The latch U22 is a D type flip flop on a 74LS175 IC chip. Lead M from the multiplex unit is connected to the D input, lead $\phi 2$ from the clock is connected to the clock input, and lead PRESET* is connected to the clear input at pin 1. The Q output is connected to the serial input of the shaft register, and also to an input of the comparator, and via lead A7 to the inverter I19.

The 128-bit shaft register U15 is a type MC14562 IC chip. Its serial output is connected to a second input of the comparator. The lead $\phi 4$ is connected to the clock input.

At the input of the comparator F4 there is an exclusive-or gate U14 on a type 74LS86S IC chip. A NAND gate G2 has one input from the gate U14 and a clock input of lead $\phi 3$. When either both inputs are high or both inputs are low, the output of gate U14 is low, which inhibits gate G2. When the inputs of gate U14 become different, a high signal at its output enables gate G2 to pass the next pulse from lead $\phi 2$. The output of gate G2 goes to a comparator one shot comprising NAND gates G13, G14, G15, with a 270-picofarad coupling capacitor from gate G13 to both inputs of gate G14, a 300-ohm resistor from the inputs of gate G14 to ground, the output of gate G14 connected to both inputs of gate G15 and also via a feedback connection to an input of gate G13, and the output of gate G15 connected via a 1-K feedback resistor to the inputs of gate G14. There are two pre-load lockout gates G16 and G17. The one-shot output from gate G15 is connected to an input of gate G16. The output of gate G16 is connected to an input of gate G17, and also to lead SIC for a scan inhibit command. The lead LL is connected to inputs of both gates G16 and G17. The output of gate G17 is coupled via two inverters I7 and I11 to the strobe lead STAB.

Figure 5:
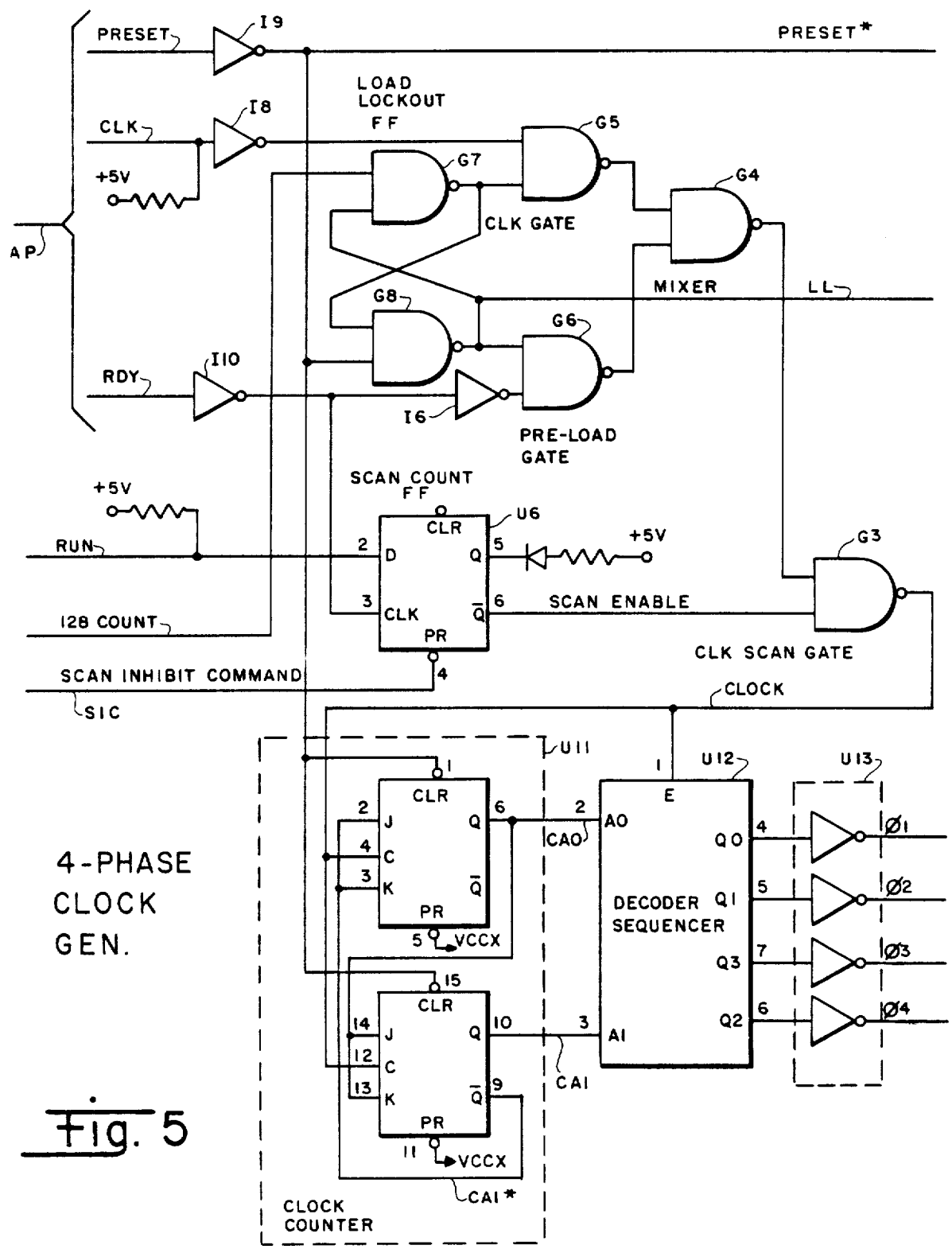
Figure 11:
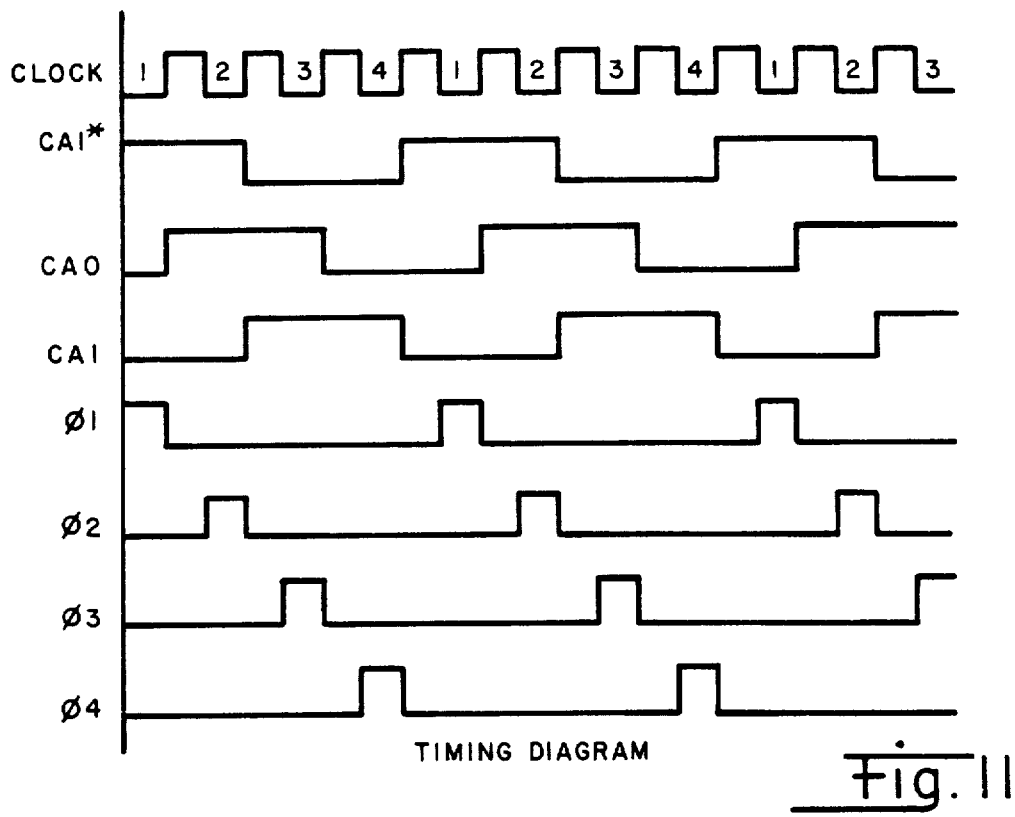
FIG. 11 is a timing diagram for the switch reader.

FIG. 5 shows the details of block F5 of FIG. 2, which comprises the 4-phase clock generator along with clock control gates and a scan count flip flop. The input via line AP from the switch reader input port provides signals on the three leads PRESET, CLK and RDY, which are connected to buffer inverters I9, I8 & I10 respectively. The output lead from inverter I9 is designated PRESET*. A 1-megahertz clock signal is supplied on lead CLK. The clock counter comprises two JK flip flops on a type 74109 IC chip U11. The clear inputs are connected to lead PRESET*, and the clock inputs are connected to the output of a clock scan NAND gate G3. The Q outputs of the two flip flops are connected to the A0 and A1 inputs of a decoder sequencer U12, which is a type 9321 IC chip. The enable input for advancing the count of the decoder U12 is connected to the same lead as the clock inputs of the counter U11. The 4-phase outputs of the decoder appear in sequence on the four leads $\phi1$, $\phi2$, $\phi3$ and $\phi4$, as shown in the timing diagram FIG. 11. Note that the enable input of the decoder U12 is used as the clock input, eliminating glitches by framing address changes which occur when the counter changes state on the rising clock edge. This clock generated at the output of the decoder is a non-overlapping clock with approximately 500 ns between clock pulses with a 1 MHz clock input.

Each of two NAND gates G7 and G8 has its output connected to an input of the other to form a load lockout flip flop. A clock NAND gate G5 has an input from gate G7, and a pre-load NAND gate G6 has an input from gate G8. The outputs of gates G5 and G6 are connected to a mixer NAND gate G3, whose output is used as the clock signal for the 4-phase clock generator. The flip flop is set initially by a signal on lead PRESET* at the input of gate G8, to enable gate G6 to pass the ready signal from inverter I10, via another inverter I6, and gates G6, G4 and G3 to provide the clock signal. The ready signal from inverter I10 is also connected to the clock input of a scan count flip flop U6 (type 7474), whose not Q output is connected to an input of gate G3 for scan enable. The load lockout flip flop is reset by a signal on lead 128 COUNT at the input of gate G7, to enable gate G5 to pass the clock signal from inverter I8, and gates G5, G4 and G3 to provide the clock signal. The preset input of the scan count flip flop U16 at pin 4 is connected to lead SIC for the scan inhibit command. The D input is connected via a resistor to +5 volts, and also to an input for test purposes.

Figure 6:
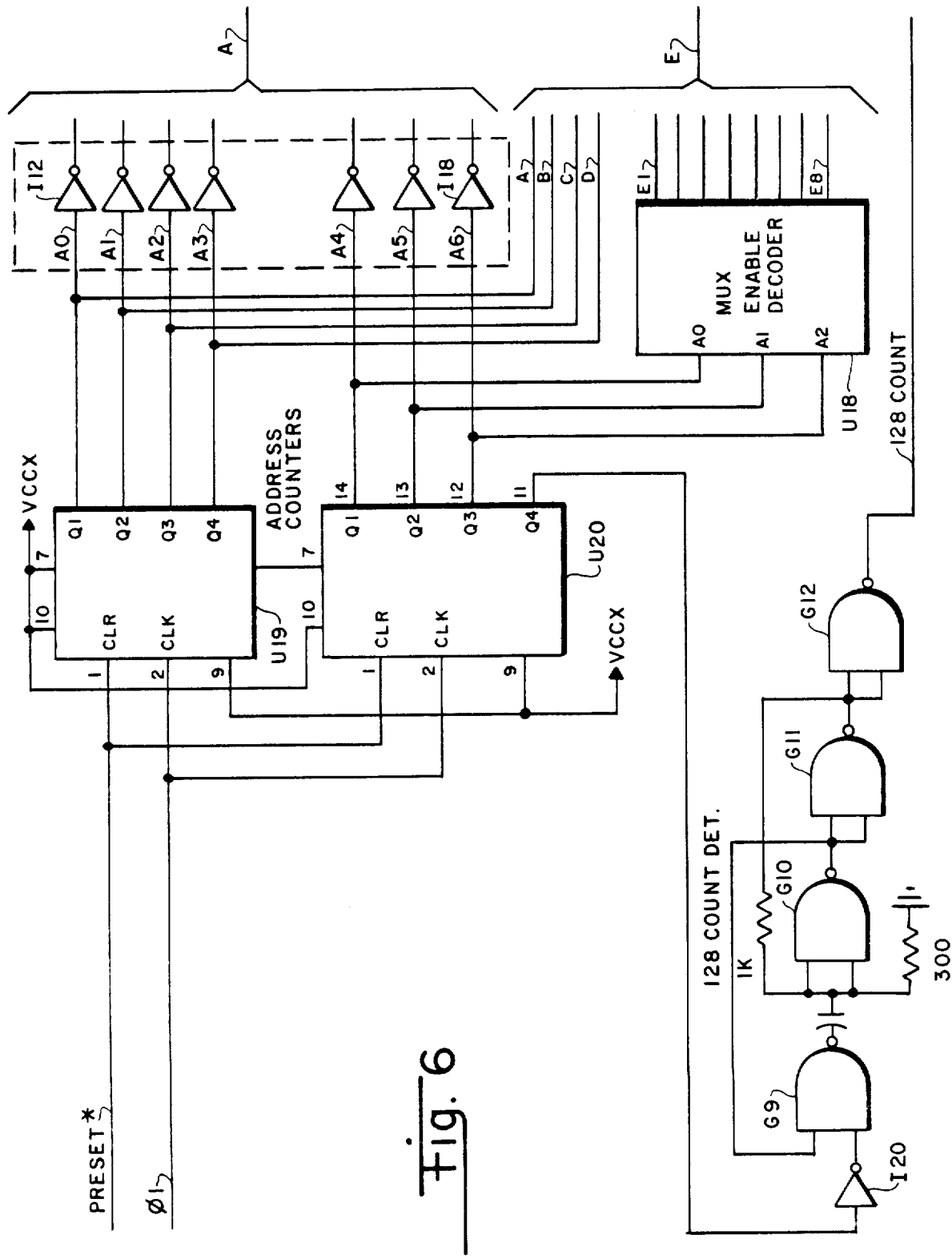

The address counter is shown on FIG. 6. It comprises two type 74LS161 IC chips U19 and U20. The clear inputs are connected to lead PRESET*, and the clock inputs are connected to lead $\phi1$. The two chips are interconnected to form an eight-bit binary counter. The first seven outputs are coupled via inverters I12-I18 to the line A for supplying the address to the switch reader input port module. The four leads from the chip U19 (the least significant bits) are also designated as A–D in line E to the multiplex unit F3; and the first three outputs from chip U20 are connected to the inputs of a decoder U18 which is a type 74C42 IC chip. The output of the decoder is a one-out-of-eight signal condition to the eight leads E1-E8 of line E.

SWITCH READER INPUT PORT MODULE

Figure 7:
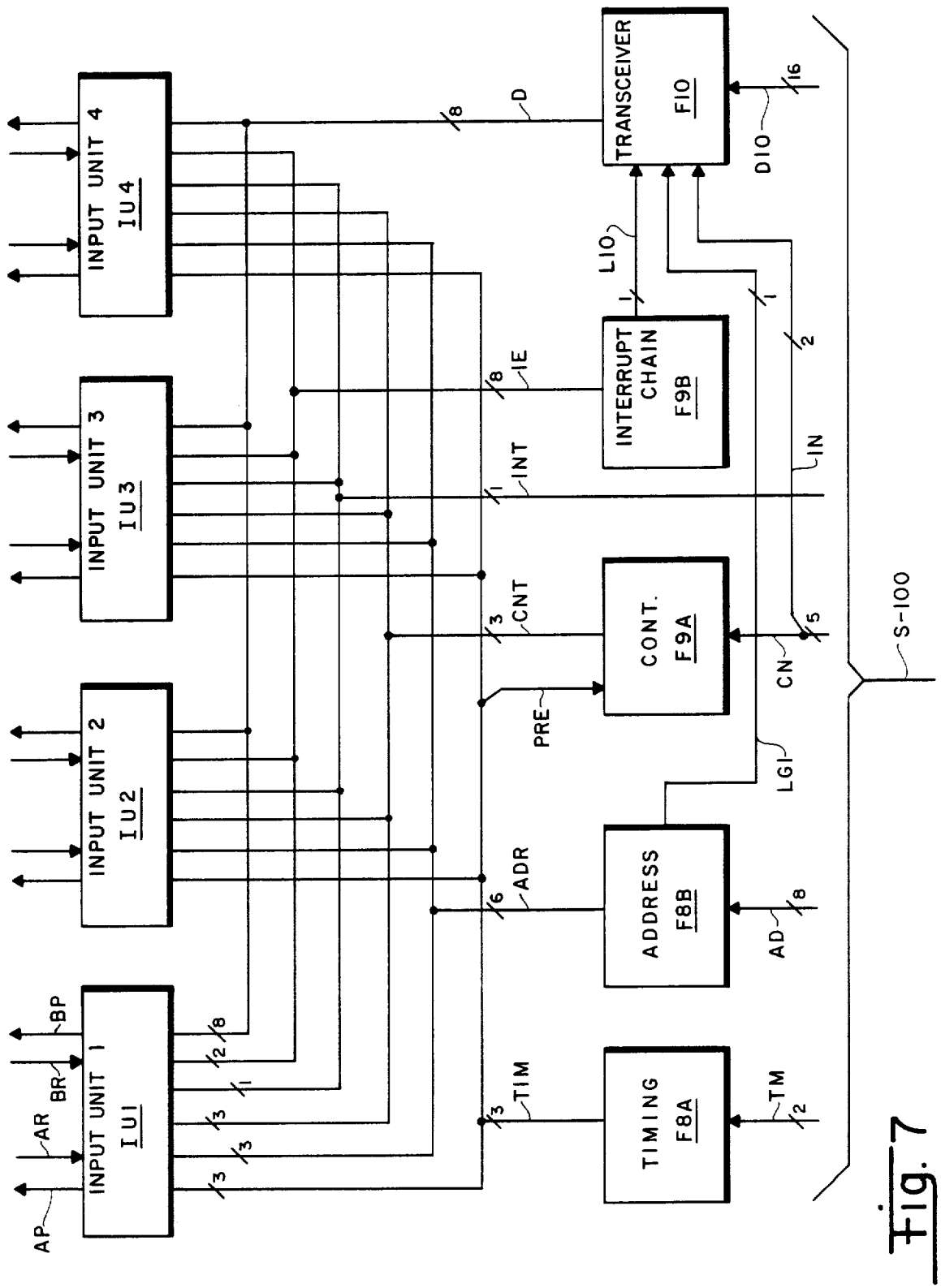
FIG. 7 is a block diagram of the swtich reader input port of FIG. 1.
Figure 8:
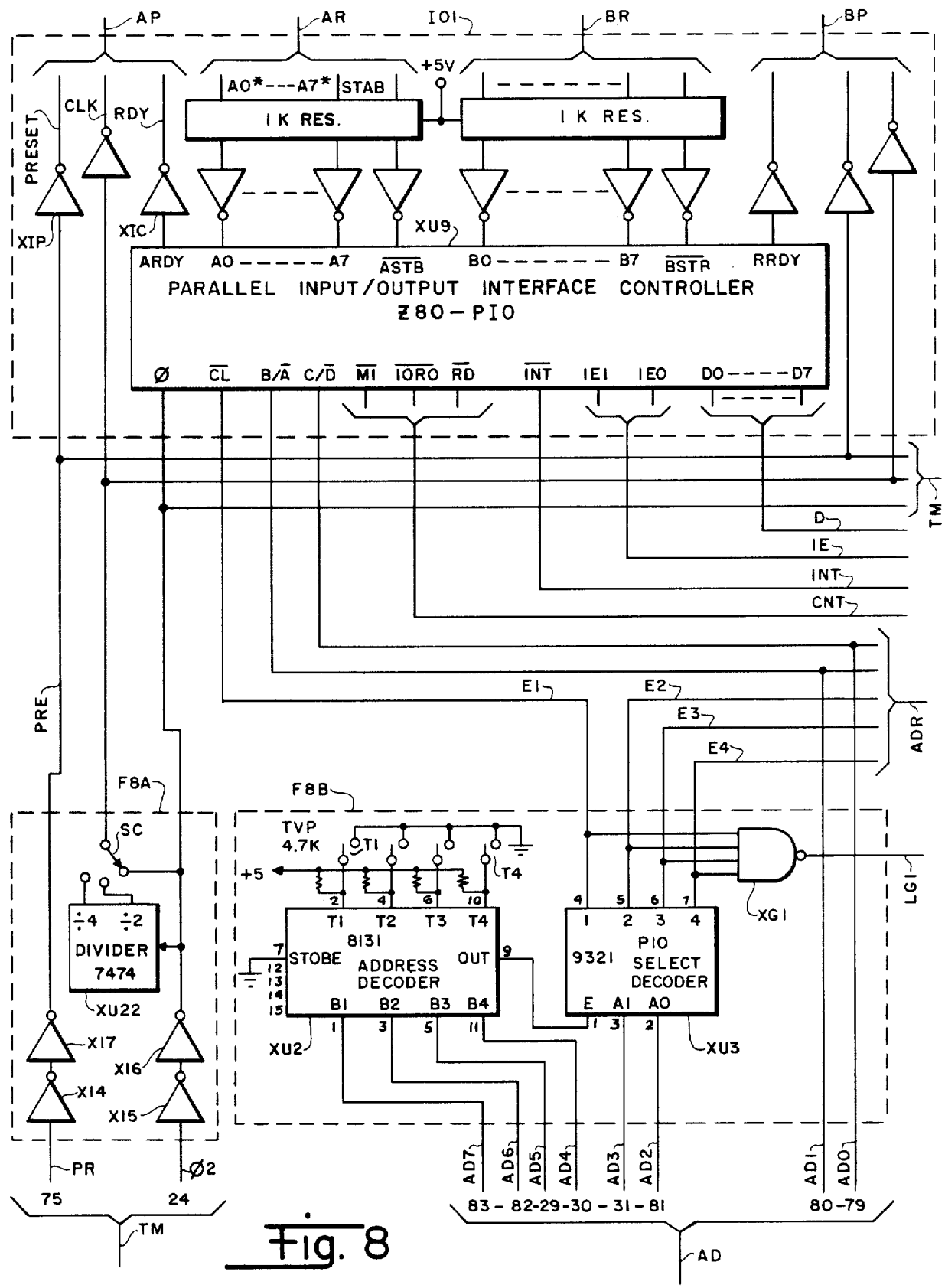
FIGS. 8–10 together comprise a more detailed functional block diagram of the circuits shown in FIG. 7.
Figure 9:
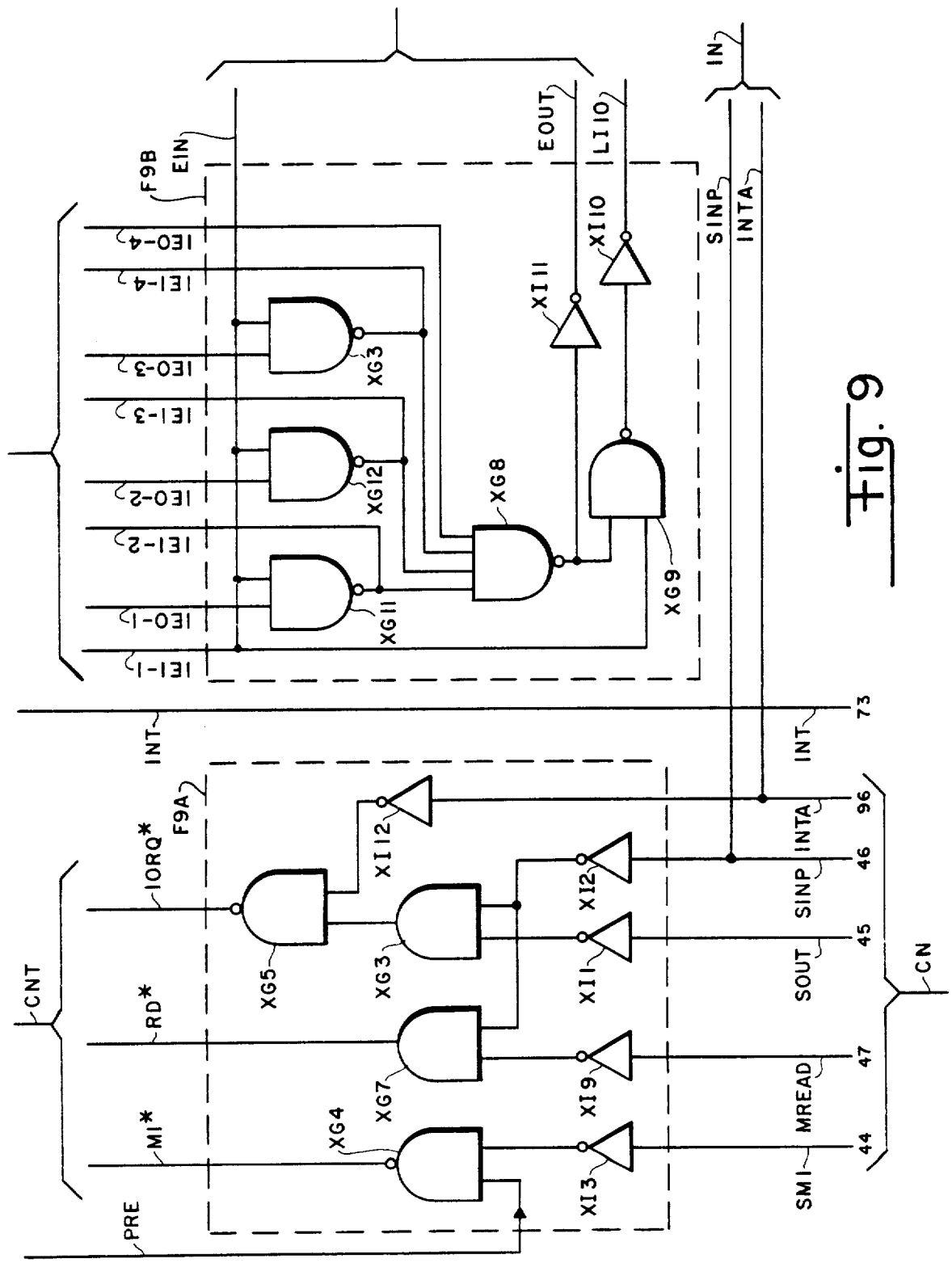
Figure 10:
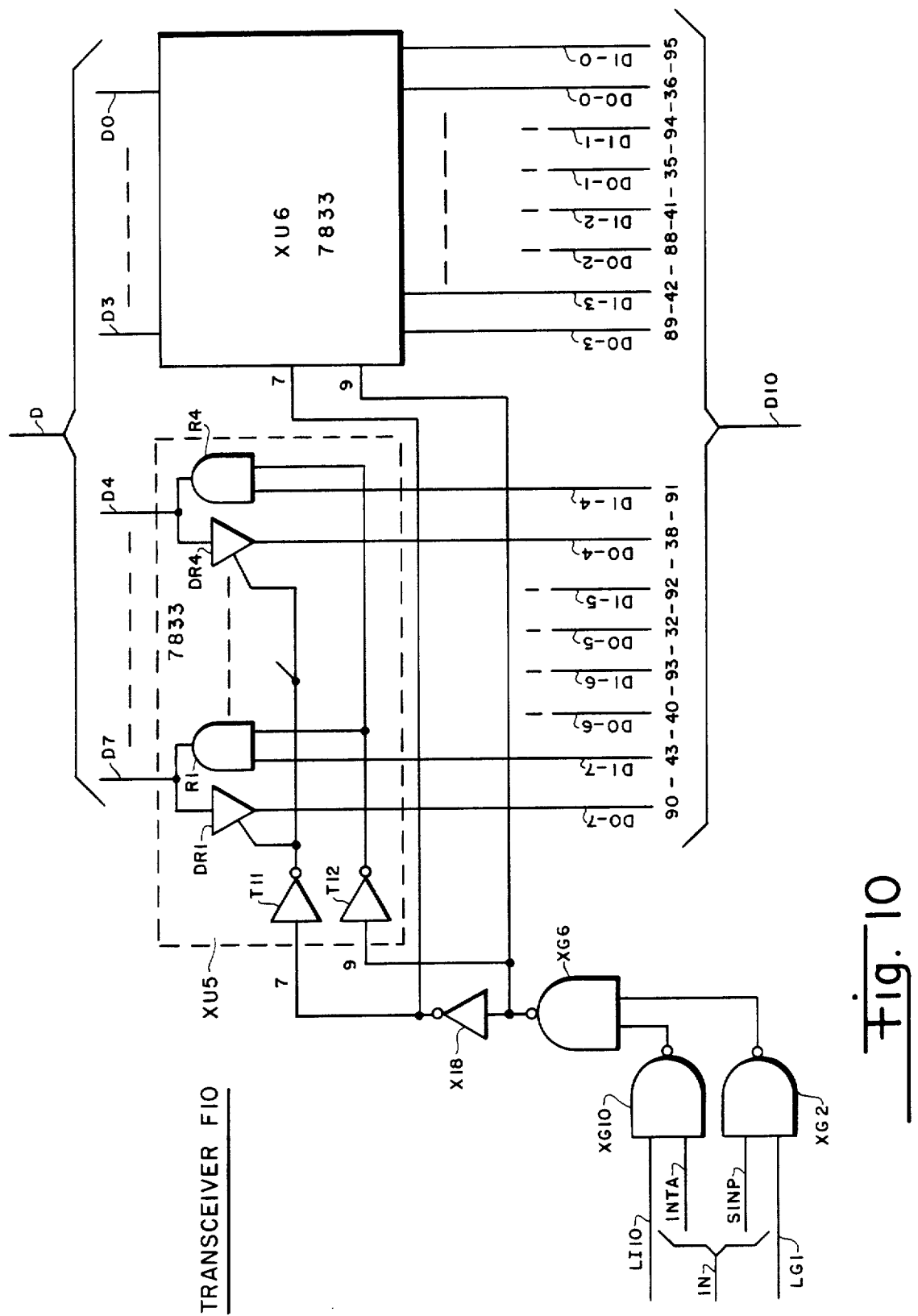

The switch reader input port module is shown by a block diagram in FIG. 7. In comprises four input units IU1-IU4 providing the eight ports for the switch reader modules. There are also interface circuits between the input units and the bus S-100, shown for convenience as timing circuits F8A, address circuits F8B, control circuits F9A, interrupt chain circuits F9B, and transceiver circuits F10. FIG. 7 shows the connections to the bus S-100 as comprising two leads TM, eight leads AD, five leads CN, one lead INT, and 16 leads DIO. In FIGS. 8-10 the connector terminal numbers are shown for each lead.

FIG. 8 shows one of the input units IU1, along with the details of the timing circuits F8A and the address circuits F8B. The four input units are identical, with unit IU1 shown as comprising a Z80 parallel input/output (PIO) chip XU9, along with inverter buffers and load resistors for its two ports.

The Z80-PIO is a programmable, two port device which provides TTl compatible interfacing between peripheral devices and the CPU. In this case the peripheral devices are the switch reader modules. One characteristic of the Z80-PIO is that all data transfer between the peripheral device and the CPU is accomplished under interrupt control. The interrupt logic of the PIO permits full use of the Z80 CPU during I/O transfers. All logic necessary to implement a fully nested interrupt structure is included in the PIO.

Another feature is that the PIO can be programmed to interrupt the CPU on the occurrence of specified status conditions in the peripheral device, which in this case is any change of the switch contact status. This interrupt capability reduces the time the processor must spend in polling peripheral status. The internal logic for each port includes an 8-bit input register and a 2-bit mode control register. In this case the mode control register is programmed by the CPU to select the mode designated byte input. The data input register accepts data from the switch reader for transfer to the CPU.

The PIO pin descriptions are as follows:
D0-D7: CPU Data Bus
B/A Sel: Port B or A select (input, active high)
C/D Sel: Control or Data Select (input, active high)
CE*: Chip Enable (input, active low)
Φ: System Clock (input)
M1*: Machine Cycle One Signal from CPU (input, active low)
IORQ*: Input/Output Request from CPU (input, active low)
RD*: Read Cycle Status from the CPU (input, active low)
INT: Interrupt Request (output, open drain, active low)
IEI: Interrupt Enable In (input, active low)
IEO: Interrupt Enable Out (output, active high). IEI and IEO form a daisy chain connection for priority interrupt control.
A0-A7: Port A Bus
ASTB*: Port A Strobe Pulse from Peripheral Device
ARDY: Register A Ready (output, active high)
B0-B7: Port B bus BSTB*: Port B Strobe Pulse from Peripheral Device
BRDY: Register B Ready (output, active high)

In the *INPUT MODE,* when STROBE* goes low data is loaded into the selected port input register. The next rising edge of strobe activates INT* if interrupt enable is set and this is the highest priority requesting device. The following falling edge of Φ resets Ready to an inactive state, indicating that the input register is full and cannot accept any more data until the CPU completes a read. When a read is complete the positive edge of RD* will set Ready at the next low going transition of Φ. At this time new data can be loaded into the PIO.

For *INTERRUPT ACKNOWLEDGE,* during M1* time, peripheral controllers are inhibited from changing their interrupt status, permitting the INT* Enable signal to ripple through the daisy chain. The peripheral with IEI high and IEO low during INTA* will place a preprogrammed 8-bit interrupt vector on the data bus at this time. IEO is held low until a return from interrupt (RETI) instruction is executed by the CPU while IEI is high. The 2-byte RETI instruction is decoded internally by the PIO for this purpose.

*RETURN FROM INTERRUPT CYCLE.* If a peripheral device has no interrupt pending and is not under service, then its IEO=IEI. If it has an interrupt under service (i.e., it has already interrupted and received an interrupt acknowledge) then its IEO is always low, inhibiting lower priority chips from interrupting. If it has an interrupt pending which has not yet been acknowledged, IEO will be low unless an "ED" is decoded as the first byte of a two-byte opcode. In this case, IEO will go high until the next opcode byte is decoded, whereupon it will again to low. If the second byte of the opcode byte decoded is "4D" then the opcode was an RETI instruction.

After an "ED" opcode is decoded, only the peripheral device which has interrupted and is currently under service will have its IEI high and its IEO low. This device is the highest priority device in the daisy chain which has received an interrupt acknowledge. All other peripherals have IEI=IEO, If the next opcode byte decoded is "4D", this peripheral device will reset its "interrupt under service" condition.

The block F8A shows the logic circuits for the preset and clock signals received from the bus S-100. The preset signal PR at bus terminal 75 is repeated via two inverter buffers XI4 and XI7 to lead PRE, which is connected in multiple as one of the leads of line TIM to all eight ports. For port A the lead PRE is coupled via inverter XIP to lead PRESET of line AP, and via similar inverters for the other parts.

The clock signal on lead φ2 at bus terminal 24 is coupled via two inverter buffers XI5 and XI6, and then in multiple to the PIO clock terminal φ of each of the four input-output units. The output of inverter XI6 is also connected to a dividing circuit XU22, and to one terminal of a clock switch SC. Circuit XU22 comprises two JK flip flops of a type 7474 IC chip connected in tandem to divide by two and by four, with the outputs connected to terminals of switch SC, so that the switch SC can be set to select divide by one, two or four. The common terminal of the switch is connected via an inverter XIC to the lead CLK of line AP, and via similar inverters for the other seven ports.

The address circuit F8B comprises an address decoder XU2 which is a type 8131 comparator IC chip, and a PIO select decoder XU3 which a type 9321 IC chip. Leads AD7-AD4 from the bus terminals 83, 82 29 and 30 are connected to the B inputs of device XU2. The T inputs of the comparator are connected via individual resistors to +5 volts, and also to individual switches which may be closed to ground. Selected ones of the switches are closed to select four address bits common to all eight ports. The out pin 9 of device XU2 is connected to the enable pin 1 of device XU3. The inputs A1 and A0 of device XU3 are connected via leads AD3 and AD2 to bus terminals 31 and 81. These two address bits are decoded by device XU3 to provide an output on one of four leads E1-E4, which are connected individually to the CE* inputs of the PIOs of the four input/output units. Address lead AD1 from the bus terminal 80 is connected in multiple to the B/A* inputs of the four PIOs, to select either the A or the B port. Address lead AD0 from the bus terminal 79 is connected in multiple to the C/D* inputs of the four PIOs, to select either control data operation. The four outputs of the select decoder chip XU3 are also connected as inputs of a NAND gate XG1, whose output is connected via lead LG1 to NAND gate XG2 for the transceiver circuits in FIG. 10.

In FIG. 9, block F9A shows logic circuits for control signals. Bus terminal 44 is coupled via lead SM1 and an inverter XI3 to an input of a NAND gate XG4, bus terminal 47 is coupled via lead M READ and an inverter XI9 to an input of a NAND gate XG7, bus terminal 45 is coupled via lead S OUT and an inverter XI1 to an input of a NAND gate XG3, has terminal 46 is coupled via lead SINP and an inverter XI2 to inputs of NAND gates XG7 and XG3, and bus terminaal 96 is coupled via lead INTA and an inverter XI12 to an input of a NAND gate XG5. Gate XG4 has another input connected to the preset lead PRE, and its output connected via lead MI* in multiple to the MI* inputs of the PIOs of the four input/output units. Gate XG7 has its output connected via lead RD* in multiple to the RD* inputs of the four PIOs. Gate XG3 has its output connected to an input of gate XG5, whose output is connected in multiple via lead IORQ* to the IORQ* inputs of the four PIOs.

The interrupt lead INT is connected from bus terminal 73 in multiple to the INT* pins of all four PIOs. The interrupt chain circuits F9B has NAND gates XG9, XG11, and XG3, each having an input connected to lead IEI-1 to terminal IEI of the PIO of the first input unit IU1, and also to lead EIN. Gate XG11 has a second input from lead IEO-1 from the IEO terminal of the first input unit IU1, and its output connected to lead IEI-2 of the PIO of the second input unit IU2. Gate XG12 has a second input from lead IEO-2 from the IEO terminal of the second input unit IU2, and its output connected to lead IEI-3 of the PIO of the third input unit IU3. Gate XG3 has a second input from lead IEO-3 from the IEO terminal of the third input unit IU3, and its output connected to lead IEI-4 of the PIO of the fourth input unit IU4. The outputs of gates XG11, XG12, and XG3, aand lead IEO-4 are also connected as inputs of a NAND gate XG8, whose output is connected as an input of gate XG9, and also via an inverter XI11 to lead EOUT. The output of gate XG9 is connected via an inverter XI10 and lead LI10 to an input of a NAND gate XG10 in FIG. 10.

FIG. 10 shows the transceiver block F10, which comprises two type 7833 IC chips XU5 and XU6, each of which has four drivers and four receivers, shown for chip XU5 as drivers DR1-DR4 adn receivers R1-R4. The driver outputs are connected via eight leads DO-7 to DO-0 to the bus terminals 90, 40, 32, 38, 89, 88, 35 and 36 respectively. The receiver inputs are connected via eight leads DI-7 to DI-0 to the bus terminals 43, 93, 92, 91, 42, 41, 94 and 95 respectively. Each receiver and the corresponding driver input are connected together to one of the eight data leads D7-D0, which are connected via line D in multiple to the eight data terminals of the PIOs of the four input/output units IO1-IO4. A NAND gate XG10 has inputs on leads LI10 and INTA and on output to a NAND gate XG6, and a NAND gate XG2 has inputs on leads L1 and SINP and an output to NAND gate XG6. Gate XG6 has its output connected directly to the driver disable input at pin 9 of each of the transceiver chips, and also via an inverter XI8 to the receiver disable input at pin 7 of each.

SWITCH READER SYSTEM OPERATION

In the operation of the switch reader system as shown in the block diagram of FIG. 1 and 2, the switch position data is coupled into the switch reader, processed and then passed on to the computer as described in the following.

To read the initial switch positions, the computer CPU first loads the 128-bit shift register U15 of the switch reader with the switch position data and also stores the address and switch data for future reference, by performing 512 read operations, with each read operation causing a pulse to be supplied via lead RDY to the switch reader module. The pulses cycle the switch reader 4-phase clock through its four stages, and once each cycle advances the address counter one step, so the 512 read operations cycle the address counter once. The address counter F6, clocked by the phase one pulse of the four-phase clock F5, selects each of the 128 input lines of the multiplexer F3 in turn. The switch data latch U22 then holds the data until the phase four clock pulse can load the switch data into the shift register.

The switch reader system is initialized at line zero after the 512th read operation. The input from each of the 128 switches appear at the multiplexer's output M, when addressed by the phase one clock, loaded into the switch data latch U22 by the phase two clock and is then presented to the comparator F4 to be checked against its previous value now stored in the last stage of the 128-bit shift register. If the comparator detects a difference in the two logic levels, the phase three clock pulse enables the comparator, and it generates an interrupt to the computer through the Z80-PIO. This compare pulse sets the scan control flip flop, which then disables the address counter. Meanwhile, whether or not there has been a change from the previous state, the multiplexer's output is stored in the 128-bit shift register. After 128 MUX scans, the output of the last stage of the 128-bit shift register is again compared to the present state of the input. This load and compare operation takes place until all 128 switch inputs have been scanned over and over or until the next switch change.

If and when an interrupt is generated, the computer, through prior programming, reads the address of the change and the new switch data through the Z80-PIO. This operation also resets the scan control flip flop, by generating a scan reset pulse from the PIO control line RDY. The signal on lead RDY re-enables the address counter which then returns the MUX to scanning the switch inputs. In summary, the circuit scans 128 switches, and detects when one has changed. When a switch has changed, an interrupt is sent to the computer. The computer then reads the address of the switch and the switch status. The circuit then continues to scan the switches.

SWITCH READER MODULE OPERATION

Refer to FIGS. 2-6. The switch reader has a LOAD mode and a RUN mode. In each mode, the four-phase clock F5 cycles through the four phases $\phi 1$ to $\phi 4$, and during each cycle advances the address counter F6 at phase one. The address counter F6 cycles through 128 addresses.

In the LOAD mode, to initialize the switch reader, the computer performs 512 read operations, and stores the internal switch address and data. To accomplish this, when the power is turned on, the computer outputs a preset pulse which is supplied to the switch reader module on lead PRESET, which on lead PRESET* at the output of the inverter I9 is active when low. This signal presets the load lockup flip flop at gate G8 (FIG. 5) to the load state, presets the four phase clock generator to phase one by clearing the clock counter U11, presets the address counter F6 to address zero, and clears the switch data latch U22. The load lockout flip flop G7-G8 then performs the following:
1. Disables the comparator by a signal on lead LL;
2. Disables the clock at gate G5; and
3. Enables the pre-load state by a high at the upper input of gate G6, which allows the RDY signal to perform the function of the clock during the load operation.

Disabling the comparator prevents the scan control flip flop from receiving scan inhibit commands during the load operation. Since the address counter is preset to zero, the address of the very first switch contact is outputted. This address will remain until the phase one clock advances the address counter to address one. The switch data is outputted from the MUX on lead M and is available at the input of the switch data latch.

The computer generates a ready pulse through the input port F7. The signal is a momentary positive pulse on lead RDY. This pulse is inverted by the inverter I10 and applied to the scan control flip flop U6 clock input. This sets the scan control flip flop *Q output high, which then opens gate G3. The pulse from inverter I10 is passed on through the preload gate G6, inverted, on to the clock preload mixer gate G-4, inverted again, and on through the clock gate G-3 as a positive pulse, to advance the four-phase clock to phase two. Upon advancing to phase two, the switch data present at the input of the switch data latch U22 will be loaded into the latch. The next signal on lead RDY will advance the four-phase clock to phase three, which will then enable the comparator F4, but since it is inhibited by the pre-load lockout gate, does nothing. The next signal on lead RDY will advance the four-phase clock to phase four, where the switch data in the switch data latche will be loaded into the 128-bit shift register U15. This process is repeated 127 more times. The 128-bit shift register will then be fully loaded, and the address counter will output a signal at pin 11 of device U20. This output will then be detected by the 128 count detector (FIG. 6), which generates a pulse on lead 128 COUNT to reset the load lockout flip flop at gate G7 to the run state. This then enables the clock gate G5, and disables the pre-load lockout gate G6, which will then allow the computer clock to run the four-phase clock generator.

In the RUN mode, the sequence is the same as was described in the load process. Phase one advances the address counter F6, and phase two stores switch data into the switch data latch U22. Phase three compares the previous switch data with the present switch data, and if different, generates a scan inhibit command and an STB signal which the input port F7 translates into an interrupt to the computer. Phase four loads present switch data into the 128-bit shift register.

Whenever the scan control flip flop U6 (FIG. 5) receives a scan inhibit command, the clock scan gate G3 is disabled to stop the four-phase clock at phase three, while the computer reads the switch address and data through the input port F7. When the computer is through, it releases the switch reader by generating a signal on lead RDY through the input port. The signal on lead RDY resets the scan control flip flop U6 which in turn re-enables the four-phase clock generator via the clock scan gate G3. The switch reader is once again in the run mode.

The phase two clock latches the switch data into the switch data latch. The latched data is then presented as an input to the 128-bit shift register U15 and the lower input of the comparator gate U14.

The phase three clock opens the compare gate G2. If the two inputs of the comparator gate U14 are different, a positive pulse is generated, and allowed to pass through the compare sample gate G2 inverted. The compare strobe one shot shapes the pulse to a very narrow pulse of approximately 150 nanoseconds wide. This pulse is normally used to trip the scan control flip flop U6 via lead, and also to generate the STAB signal used to initiate the interrupt. In the MUX load configuration, the load lockout flip flop gate G7 output is low and turns off both gates G16 and G17 of the comparator.

The phase four clock loads the switch data into the 128-bit shift register U15, and the next phase one clock advances the address counters to the second address and so on until all 128 inputs have been loaded into the 128-bit shift register U-15 and stored by the computer.

At the count of 128 the address counter F6 is returned to zero. Also, when the output of the address counter F6 transitions to the count of 128, which will be high, the output is inverted by inverter I20 to a low and then the signal is applied to the 128 count detector one shot gate G9. The negative transition triggers the 128 count detector one shot, generating a 150-nanosecond negative pulse at gate G-12. This negative pulse is then applied via lead 128 COUNT to the load lockout flip flop gate G7. This pulse will reset the flip flop to the run mode and place a high on the clock gate G5, which will open the clock gate to the 1 MHz clock signal. The output of gate G5 places a low on the preload gate G8, locking out the ready pulses on lead RDY. The 128-bit shift register is now fully loaded and the system is in the run mode.

The multiplex unit F3 is addressed in the same manner as described in the load mode, but now the four-phase clock generator is clocked by the 1 MHz clock. The 1 MHz clock is received on lead CLK from the input port F7, buffered by inverter I8 and delivered to the clock gate G5. At a 1-MHz clock rate, a switch is sampled or read every 4 microseconds. To read all 128 switch inputs will take 512 microseconds or a little over 0.5 milliseconds.

First, assume that the 128-bit shift register U15 has been loaded with an input of all switches off. An off switch is represented by a low at the shift register and comparator input on lead A7. Also assume that the 128-bit shift register U15 is turned on. Activated by the phase one clock, the address counter is cycling through each and every switch input address. All of the inputs from the switch data latch U22 and the 128-bit shift register U15 to the comparator are low, therefore no output from the comparator.

Now assume that the switch S15 is turned on. When the address decoder reaches count 15, the multiplex unit F3 outputs a low on lead M, which is inverted to a high by inverter I1. This high is latched into the switch data latch U22 by the phase two clock and becomes the new switch data. This new data is presented to the 128-bit shift register U15 and to the comparator F4. The comparator sees the new input 15 switch data and the previous switch data from the last stage of the 128bit shift register are different and the comparator output transitions high. This high is applied to the input of gate G2. Upon the application of the phase three clock to the other input of gate G2, a negative pulse, the width of the phase three clock, is generated at the output of gate G2. The negative pulse is reshaped by the compare strobe one shot to a 150-ns wide positive pulse. This pulse is then applied to an input of gate G16. Since gate G16 is turned on via lead LL from the load lockout flip flop, a negative 150-ns wide pulse is passed onto gate G17 and to the scan control flip flop U6. The scan control flip flop then locks out the clock gate G3. This will stop the address counter. The negative pulse from gate G16 is also applied to an input of gate G17. Since gate G17 is also enabled by the load lockout flip flop via lead LL, the pulse is passed through the gate, and inverted to a positive pulse. The pulse is then inverted to a negative pulse by inverter I7. This negative pulse is the strobe pulse which will signal the input port F7 to generate the interrupt to the computer. The strobe pulse is then buffered and inverted by inverter I11 and routed via lead STB to the the input port module F7, where it is again inverted by a buffer to a negative pulse.

After the computer has serviced the input unit IU1, the computer will send back a positive ready signal on lead RDY. This signal is inverted by the receiver inverter I10 and applied to the clock input of the scan control flip flop U6 which in turn re-enables the clock gate G3 and the swtich reader is off and scanning.

SWITCH READER PORT MODULE OPERATION

Referring to FIGS. 7-10, whenever a switch reader reads a switch change, the switch reader generates a strobe signal on a lead, which for the switch reader SR1 is lead STAB. The strobe signal is processed by the switch reader port module F7 to generate an interrupt. The interrupt is then placed on lead INT of the bus S-100 to the processor CPU. When an interrupt is generated, the microprocessor, through prior programming, reads the location of the change and the new switch data through the PIO device, which for switch reader SR1 is port A of the device XU9. This operation also generates a scan reset pulse from the PIO control terminal ARDY, which is buffered to lead RDY.

To initialize the switch reader module, a power on preset signal is generated by the processor on lead PR of the bus S-100. This signal is a short duration low strobe which is buffered by two inverters XI4 and XI17 to a low on lead PRE, which is connected in multiple to all eight ports. At each port the signal is buffered again and output to the switch reader. For the the first port the buffer is inverter XIP, whose output is lead PRESET. The preset signal on lead PRE resets the PIO's of all four input units IU1-IU4 through gate G4 (FIG. 9) and lead MI*.

When the switch reader generates a strobe signal, it is applied to via a buffer inverter to the strobe terminal of the selected PIO. For example, a signal on lead ASTB signal from the switch reader SR1 is applied to terminal ASTB* of the PIO device XU9. A low level on this pin loads switch data into port A0 through A7 and the rising edge of the ASTB line actuates the interrupt request line low at terminal INT*, if the interrupt enable is set, and this is the highest priority requesting port. The next falling edge of the clock input will then reset the ARDY line within the PIO device to an inactive state, signifying that the PIO registers are loaded with switch data and further loading must be inhibited until the processor reads the data. The interrupt is supplied via lead INT to the processor CPU.

Some time after an interrupt is requested by the PIO, the processor CPU will send out an interrupt acknowledge. During this time the interrupt logic of the PIO will determine the highest priority port which is requesting an interrupt. (This is simply the device with its interrupt enable input "IEI" high and its interrupt enable output "IEO" low). The highest priority device places the contents of its interrupt vector register, previously programmed, via the transceiver TR to the leads DO-1 to DO-7 of the bus S-100 to the processor CPU.

The interrupt acknowledge (MI* and IORQ*) is derived in the following manner. The processor CPU receives the interrupt signal and responds by strobing high the lead INTA of the bus S-100. This signal is repeated via inverter XI12 and Gate XG5 to lead IORQ* and applied to all four PIO's.

While IEO is low, it is inverted by gate XG8 to a high and applied to gate XG9. The other input of gate XG9 from lead IEI-1 is still high from the priority chain and this produces a low at the output of gate XG9. This low is then inverted by inverter XI10 and is applied via lead LI10 gate XG10. Gate XG10 allows the positive signal on lead INTA to pass through, inverted, and enables the bi-directional transceiver TR, allowing the PIO vector to be put on the bus S-100 and to be read by the processor CPU, which (1) applies the address of the PIO to be serviced; (2) sets up its data bus to receive data; and (3) activates the read and control signals.

The processor will in the course of its interrupt service routine, read the data from the interrupting port. When this occurs, the positive edge of a signal on lead M READ from the processor, via inverter XI9 and gate XG7 to lead RD, applies a signal to terminal RD* of all four PIOs*. This signal with the PIO being serviced will raise the ARDY line with the next low going transition of the clock, indicating that new switch data can be loaded into the PIO and, at the same time, returns the switch reader to the scan mode.

It should be noted that after the acknowledgement of an interrupt, the PIO then monitors the data bus for the instruction "EDH" or binary "11101101" while *MI and *RD are low and *IORQ is high. If found, the next instruction on the data is "4DH" or binary 01001101. This instruction is then executed as a return from interrupt (RETI). The PIO will make IEO high (unless IEI is low), indicating that lower priority interrupt may new be allowed. If the PIO was not allowed to interrupt when *ASTB occurred, because IEI was low, then upon the above sequence, the PIO will make IEO high (unless IEI is still low), indicating that the interrupt was missed.

If the highest priority PIO is acknowledged and all others missed (in the case of a glitch or simultaneous switch changes), the interrupt processing software tests and processes the the interrupting device and all lower priority switch reader PIO's before executing the return form interrupt instruction "RETI" (ED followed by 4D). This insures no switch is missed when multiple switch reader boards are used in a system.

All other switch reader ports operate in the same fashion. The interrupt priority of each PIO, the A side the higher of the two and the priority chain of the PIO's in from PIO-1 being the highest and PIO-4 the lowest.

The address lines AD through AD7 of the switch reader port module are addressed with the appropriate address, that is, an address that matches the address set up by the jumpers on T1 through T4. The magnitude comparator XU-2 compares the incoming address with the address set up by the rocket switches. Note: connected addresses are low, unconnected are high. If the addresses match, the comparator XU2 will generate a low from its output to the E input of decoder XU3, which enables the decoder. The address lines AD2 and AD3 are then used to select the desired PIO by a signal on one of the four leads E1-E4. The PIO enable is a low. This signal also produces a high on lead LG1 at the output of gate XG1.

The processor outputs a read command that consists of the following. A high signal on lead M READ of the bus S-100 via inverter I9 applies a low signal to an input of AND gate XG7, which will generate a low at its output on lead RD*, which is applied to the terminal RD* of the selected PIO.

A high signal on lead S INP of the bus S-100, is applied via an inverter I7 as a a low at an input of AND gate XG3. The signal on the output of gate XG3, which is also low, is then applied as an input of AND gate XG5. This low is processed by the gate XG5 to lead IORQ* and applied to terminal IORQ* of all PIO's. As covered before, the data is read, RDY returns to a high which provides the reset for the switch reader scan control.

SWITCH READER TEST SET

The switch reader test set shown in FIGS. 12-15 is designed to allow the maintenance person to troubleshoot the switch reader module outside of the trainer environment.

Figure 12:
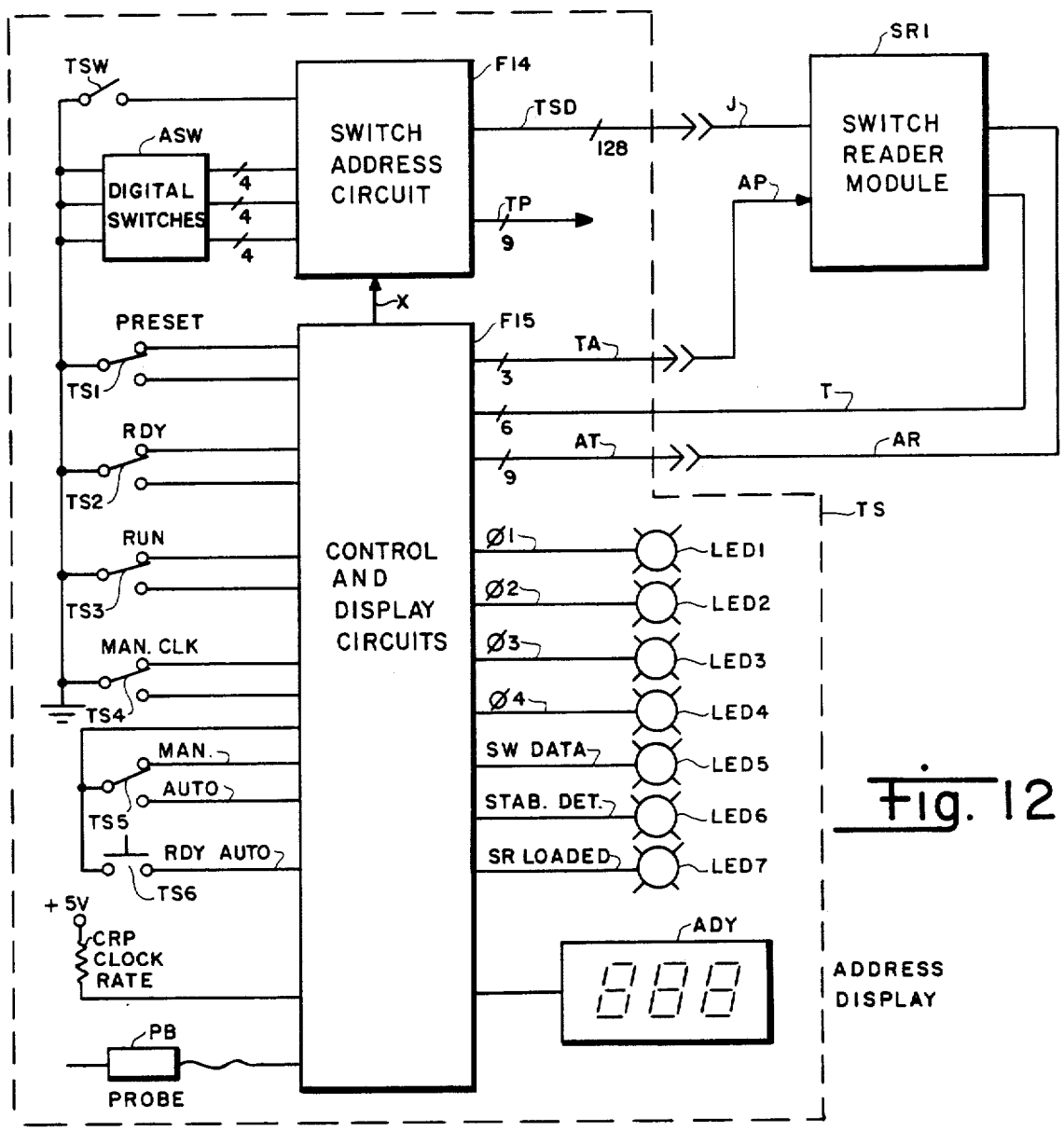
FIG. 12 is a diagram showing a test set connected to a switch reader module.

As shown in FIG. 12, a test set TS comprises a switch address portion F14 and a control and display portion F15. The test set also includes a panel having a number of switches, controls, and displays shown in FIG. 12.

A switch TSW is used to simulate the the switches S0-S1023 shown in FIG. 1, testing one switch reader module at a time. In FIG. 12 the test set is shown connected to the switch reader module SR1, in which case the switch TSW simulates the 128 switches S0-S127. The switch to be simulated is selected by a set of digital switches ASW, comprising three binary-coded-decimal switches, for setting any address from 000 to 127. The switch address portion SA of the test set performs a demultiplexing function, by placing the binary state of the switch TSW on one of 128 ooutputs shown as a line TSD, as determined by the setting of the address switches ASW. The line TSD is cabled to a set of jacks which for testing are mated with the jacks J of the switch reader SR1 in place of the cabling to the switches S0-S127 of FIG. 1. The address set on the switches ASW is also supplied in binary form on seven leads of line TP, along with a switch data bit showing the state of switch TSW, and a manual clock bit from lead X.

For the test control and display portion F15 of the test set TS, there are inputs from switches comprising a preset test switch TS1, a ready test switch TS2, a run test switch TS3, a manual clock switch TS4, manual-/automatic select switch TS5, and a switch TS6 for controlling the supply of ready pulses automatically. There is also a clock rate potentiometer control CRP. The display includes light emitting diodes LED1-LED4 for the clock phase, LED5 for the switch data bit, LED6 for the strobe detector, the LED7 for the switch reader loaded signal. A seven-segment type display ADY for three digits displays the address from the address counter of the switch reader. There is also a test probe PB with a flexible cable to the panel.

Figure 13:
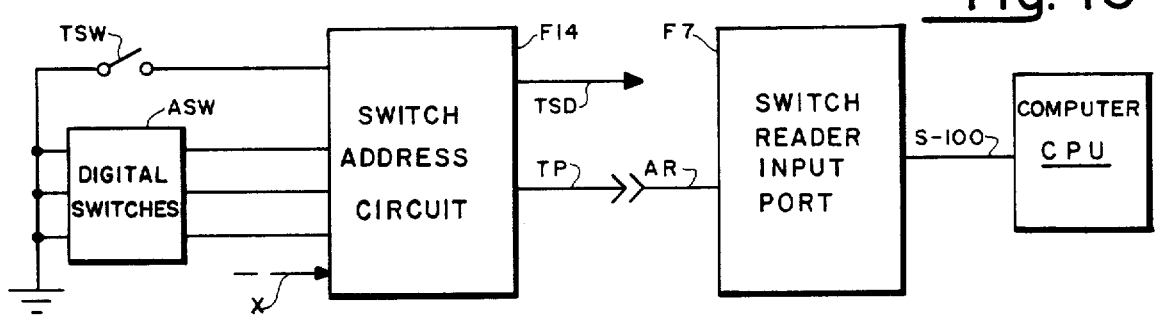
FIG. 13 is a diagram showing the test set connected to the switch reader input port.

FIG. 13 shows another test setup in which the line TP from the test address portion SA of the test set is connected to the line AR of the switch reader input port F7, which has the normal connection to the processor CPU.

Figure 14:
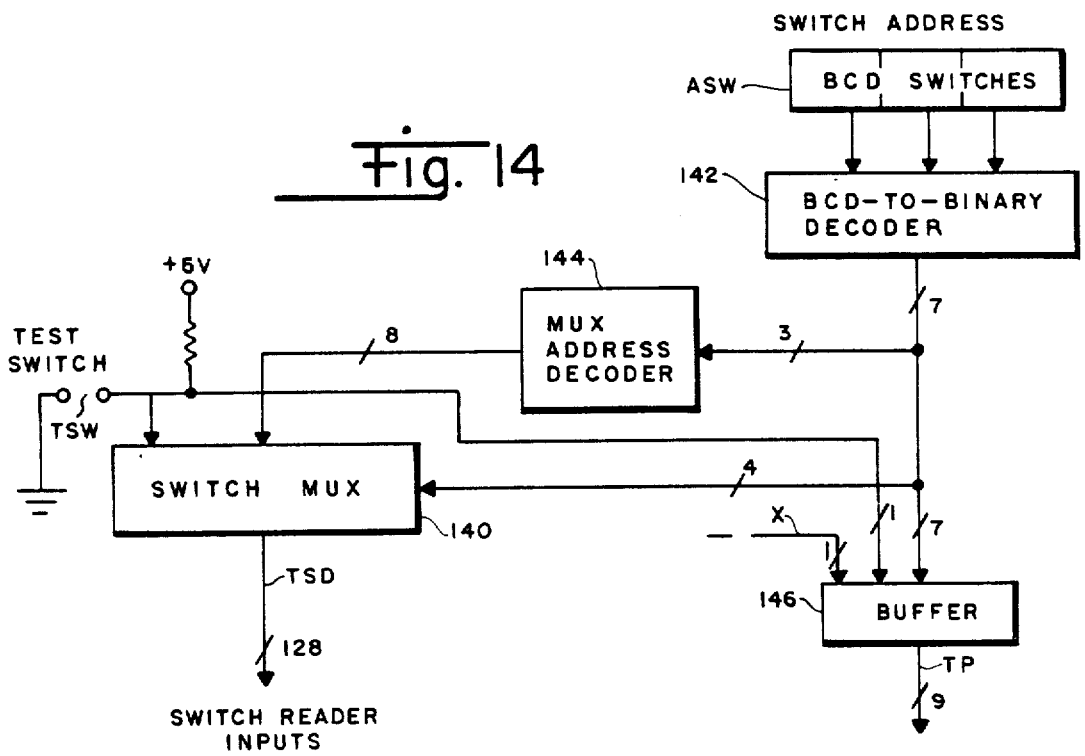
FIG. 14 is a block diagram of the switch address portion of the test set.

The switch address circuit F14 is shown by a functional block diagram in FIG. 14. The principal block is a switch multiplex unit 140 which comprises eight type 74154 multiplex IC chips. The lead from the switch TSW is connected to the G1 input of all eight chips. The switch-address binary-coded-decimal switches ASW are connected to a BCD-to-binary decoder 142 which comprises five type 74184 IC chips and twelve input inverter buffers. The output comprises the seven bits A0–A6 of the switch address. The leads for the four bits A0–A3 are connected to the A, B, C and D inputs of all eight of the multiplex chips of unit 140. The leads for the three bits A4–A6 are connected to a decoder 144 which is a type 7442 IC chip, and decoded to a one-out-of-eight signal to leads which are connected individually to the G2 input of the eight multiplex chips. Each multiplex chip has sixteen outputs, or a total of 128 ouput leads in line TSD. The buffer 146 comprises nine inverters, seven of which have inputs from the output of the decoder 142, one from the switch TSW, and one from lead X.

Figure 15:
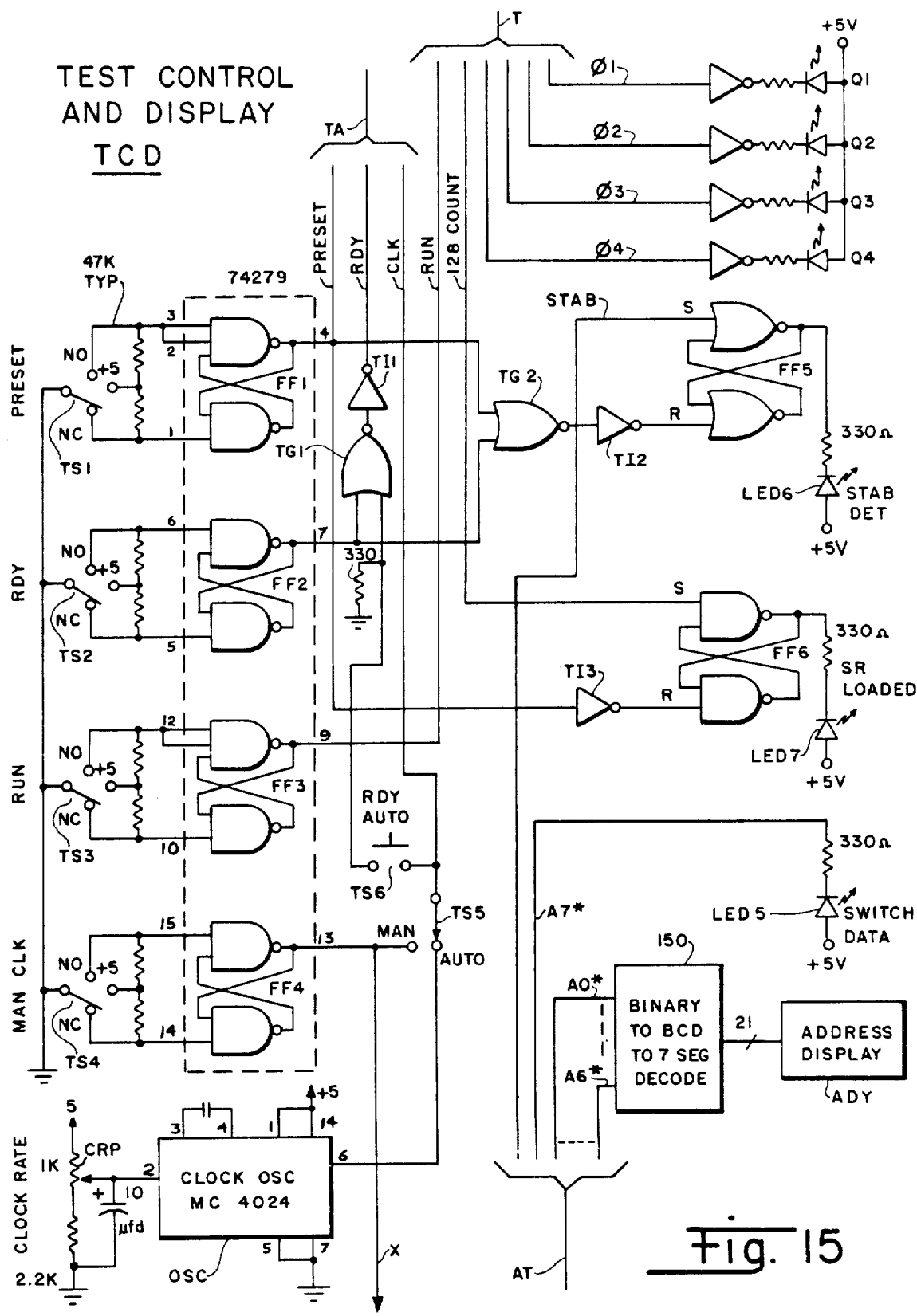
FIG. 15 is a functional block diagram of the control and display portion of the test set.

The control and display circuit F15 is shown by a functional block diagram in FIG. 15 There are four flip flops FF1–FF4, each comprising two NAND gates on a type 74279 IC chip. A flip flop FF5 comprises two type 7402 NOR gates, and a flip flop FF6 comprises two type 7400 NAND gates. Thef our flip flops FF1–FF4 are used to debounce the switches TS1–TS4 respectively. A clock oscillator OSC comprises a type MC 4042 IC chip with resistors and capacitors. The clock oscillator is a dual voltage controlled stable IC. The frequency of this device is controlled by the RC time constants of the clock rate control, the 2.2K resistor connected from the bottom end to ground and the 10-microfarad capacitor C-6. The range of this oscillator is from approximately 300 KHz to 1 MHz. The output of the oscillator is routed to the clock select switch TS5 and on to lead CLK of line TA to the switch reader module under test.

The AUTO RDY push button TS5 diverts the clock signal into the OR gate comprising gate TG1 and inverter TI1 and routes it to the clock output. Note that the clock select switch TS5 must be in the AUTO position.

As shown in FIG. 12, the output line AR from the switch reader is coupled to the input line AT of the test set. FIG. 15 shows that the seven address leads A0*-A6* are coupled via a decoder block 150, which includes a binary-to-BDC decoder having three type 74185 IC chips, whose outputs are connected to a BCD-to-7-segment decoder having three type 7446 IC chips. The decoded outputs are connected the the three-digit display unit ADY. The lead A7* from line AT is coupled via a resistor to the light emitting diode LED5 to display the switch data status. The lead STAB from line AT is connected to the S input of flip flop FF5.

As shown in FIG. 12, the output line TA from the test set is coupled to the input line AP of the switch reader. The leads $\phi1-\phi4$ are coupled via respective resistors and inverters to the light emitting diodes LED-1-LED4 for displaying the phase of the switch reader clock. The lead 128 COUNT is connected to the set input of flip flop FF6. The lead RUN is the output of flip flop FF3 at pin 9.

The normally open and normally closed contacts of the preset switch TS1 are connected respectively to input pins 3 and 1 of the flip flop FF1; the normally open and normally closed contacts of the ready switch TS2 are connected respectively to input pins 6 and 5 of the flip flop FF2; the normally open and normally closed contacts of the run switch TS3 are connected respectively to input pins 13 and 10 of the flip flop FF3; and the normally open and normally closed contacts of the manual clock switch TS4 are connected respectively to input pins 15 and 14 of the flip flop FF4. The outputs at pin 4 of flip flop FF1 and pin 7 of flip flop FF2 are connected as inputs of a NOR gate TG2, whose output is coupled via an inverter to the reset input of flip flop FF5. The output at pin 4 of flip flop FF1 is also connected to lead PRESET OF LINE TA, and via an inverter T13 to the reset input of flip flop FF6. The output at pin 7 of flip flop FF2 is also connected to to an input of a NOR gate TG1, whose output is connected via an inverter TI1 to the lead RDY of line TA. The other input of gate TG1 in normally grounded via a 330-ohm resistor, and may be connected to the output of the clock oscillator OSC by closing switch TS6 and operating switch TS5 to the automatic position. The junction of switches TS5 and TS6 is connected to the lead CLK of line TA. The output at pin 13 of flip flop FF4 is connected to the manual contact of switch TS5 and also via lead X to the buffer 146 in FIG. 14.

OPERATION OF THE TEST SET

There are two modes of operation. The first mode is the manual mode. This allows manual loading of the switch reader card as would be done by the computer, one step at a time. After the card is loaded, the switch reader can be stepped through each phase of operation one step at a time. This is a slow process, but is sometimes desirable when troubleshooting the load sequence. It is also a good way to learn how the switch reader module works.

The second mode of operation is the auto run. This mode allows for easy and quick loading of the switch reader card. The clock rate is normally 1-MHz when the clock rate knob is fully clockwise, but can be turned to a slower rate, "counterclockwise" if desired. The clock can also be shifted to the manual mode when required.

All toggle switches except the clock select have two actions. If the switch is activated until it just clicks, it is used in a momentary fashion, and generates a momentary signal, but if fully toggled, will generate a constant signal level for that function.

The switch input to the switch reader card is simulated by the toggle switch TSW (labelled "switch"). This switch is routed to any one of the 128 inputs of the switch reader module by the lever switches ASW (labeled switch address). The address runs from (000) for the first switch input to (127) for the last switch input for a total 128 switches. The switch data address readout at the display ADY indicates the address of the switch that the switch reader has just read. When the switch reader module is reading properly, the switch address lever switch and the switch data address readout should match.

The preset switch TS1, the RDY switch TS2 and the clock switches simulate signals required by the switch reader card from the computer. The run switch TS3 is a manual means to reset the scan control flip flop U6 of the switch reader (FIG. 5) when normal operations fail.

The switch reader clock status display LED1-LED4 show the status of the four-phase clock U11-U12 in the switch reader. When a lamp is lit, this indicates the clock's active state. The STAB.DET LED6, when lit, indicates a strobe pulse was generated. The switch data LED5 indicates if a switch that was read is on or off. If the lamp is lit, the switch is on.

The test set has a built-in logic probe PB which is used to troubleshoot the switch reader card. The switch reader test set also has a 26-pin cable TP that allows the switch reader test set to be used as a switch input for the switch reader port card F7, and can be used while the card is under test in the computer CPU.

To test a switch reader module, first make the connections to the test set and shown in FIG. 12. For manual clock with load operation, make the following initialization:

A. All toggle switches in up position (as shown in FIG. 12).
B. Turn power on.
C. SR LOADED light LED7 should be on.
D. Switch data address switch ASW set to (000).
E. Switch reader clock status phase 1 light LED1 is on.
F. STAB.DET. light LED6 should be on.
G. Clock rate control CRP fully clockwise.
H. Switch address readout ADY should read (000).

Operation:
1. Set clock switch TS5 to Manual POS.
2. Bump preset switch TS1. This switch simulates processor powerup preset. The switch data address display ADY will go to (000) and the switch reader clock status lamps will indicate phase-1 clock by light LED1 being on.
3. Bump RDY switch TS2 512 times. This simulates the processor loading the switch reader shift registers and the processor. Note that the switch reader clock status indicators LED1-LED4 will cycle from phase one through phase four 127 times. The switch data address display ADY will start at (000) and cycle through (127) and then back to (000). The SR load lamp LED7 will then extinguish, indicating that shift register load has been completed.
4. At the end of SR load, the clock will have cycled through the phase 1 position. The first manual clock lamp will bring up phase 2 on the switch reader clock status indicator with the lamp LED2 being on. Note that the switch reader clock status LED2 is on only while the switch is in the active position. The second manual clock lamp will bring up phase 3 on the switch reader clock status indicator. The third manual clock bump will bring up phase 4 on the switch reader clock status indicator. The fourth manual clock bump will bring up phase 1 on the switch reader clock status indicator and the switch data address display ADY will read (001). As the four-phase clock cycles through each phase, it has a specific task to accomplish in the switch reader card. Each task is as follows:

a. On preset, the phase 1 clock starts out high. This enables the chip MUX 1 (FIG. 4) and inputs switch data to lead A7 and to the switch data latch U22 from switch address 000.
b. On the first clock toggle, phase 1 clock goes low, phase 2 clock goes high. This latches chip MUX 1, now switch data from address 000 is loaded into the swtich data latch.
c. On the second clock toggle, phase 2 clock goes low, phase 3 clock goes high, enabling the comparator gate U14. The comparator F4 compares the new switch data with the previous switch data.
d. On the third clock toggle, phase 3 clock goes low, phase 4 clock goes high, shifting new switch data into the first stage of the shift register U15.
e. On the fourth clock, phase 4 clock goes low, phase 1 goes high and advances the address counter F6 to MUX 1 input 1. This process continues until the address counter has cycled through all 128 switches.

CLOCK AUTO RUN

For clock automatic run operation, if it is desired to skip the manual clock mode to get the switch reader up and running, do the following steps.

1. Set clock switch TS5 to AUTO position.
2. Bump Present switch TS1.
3. Press the load button (switch TS6) just above SR LOADED lamp LED7. You will notice that the SR LOADED lamp LED7 is extinguished, the switch data address display ADY is a blur and also the switch reader clock status indicators LED1-LED4 are dimly lit. This indicates that the switch reader is loaded, and is running on the internal 1 MHz clock.

For troubleshooting of the test set, to sequentially test each switch input of the switch reader card, the address is set in on the switch address lever switches ASW. The address of the first input is (000). If we toggle the switch TSW, the switch data address display ADY reads out (000), which matches the address switch setting. Also note that the STAB.DET. light LED6 is on, so a strobe signal was generated. The switch data lamp LED5 is lit, indicating the switch went to the on state. Also note that the switch reader clock status LED1-LED4 stopped at clock phase 3. This is where the new switch data was compared to the old switch data and was found to be different.

Now bump the RDY switch TS2, the switch reader went back to the scan mode and is again looking at all switch inputs. Toggle the switch TSW back to the normal position (up). The switch reader again stops and with the same readouts as before, except for the switch data lamp LED5. It is now out and indicates that the (000) switch went back to the off state.

Now bump the RDY switch TS2 again, the switch reader is back in scan. Now bump the switch TSW, the switch reader stops as before and indicates correct address, phase 3 clock, a strobe is detected and the switch is on. Now bump RDY. Note that the switch reader did not go back to scan. The phase 3 clock is on, a strobe was detected, but now the switch data lamp shows the switch is off. When the switch TSW was bumped, the switch reader read two switch actions and displayed them one after the other. Now bump RDY again and the switch reader is back in scan. This test can be run for each and every input of the card reader from address (000) through (127).

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Apparatus for reading the status of a plurality of switch contacts, which comprises an input port module and at least one switch reader module, the input port module having a plurality of ports and coupling to a processor via a bus, the switch reader module being coupled between a maximum of N of said switch contacts and one pot of the input port module;

wherein said switch reader module comprises a multiplex unit, a latch, an N-bit shift register, a comparator, a clock, and an address counter; with the coupling between said switch reader module and said one port including M address data leads, one switch data lead, a strobe lead, a clock lead, and a ready lead, $2^M$ being equal to N;

wherein said multiplex unit comprises multiplex means having N inputs coupled to said N switch contacts, address inputs from said address counter, and a multiplex output, for supplying a multiplex output signal to the multiplex output representing the state of one of the switch contacts as determined by signals at the address inputs;

wherein said clock comprises clock counting means having a clock input and four outputs designated phase one, phase two, phase three and phase four, for placing an active signal on one of the four outputs counting from one to four and then back to one, with the count advancing in response to each pulse at the clock input; the clock input being coupled via said clock lead from said port, and via the input port module and said bus, to receive clock signals from said processor; a scan count flip flop having an input on a scan-inhibit lead from the comparator, an input coupled to said ready lead, and an output to a clock scan gate, the clock scan gate being part of said coupling between said clock lead and the clock input of the clock counting means, the scan count flip flop having a first state and a second state which respectively enable and disable the clock scan gate;

wherein said address counter comprises a binary counter having a clock input from said phase one output of the clock, for counting pulses at its clock input from zero to N, and M output leads coupled to said address-data leads, the M output leads being also coupled to multiplex address means which supplies the address to the address inputs of the multiplex means in the form required;

said latch having an input from said multiplex output, a switch-data output coupled to said switch-data lead, and a clock input from the phase two lead for loading data from the multiplex means at phase two of the clock;

said N-bit shift register having a serial input from said switch-data output, a serial output to a previous-state lead, and a clock input from the phase-four output for shifting data from the serial input at phase four of the clock;

said comparator having comparison inputs from said switch-data output and the previous-state lead, a strobe output coupled to said strobe lead, an output to said scan-inhibit lead, and a clock input from the phase three lead, the comparator having means responsive to a pulse at its clock input and the comparison inputs being different to generate a pulse supplied to the strobe lead and also to the scan-inhibit lead, with the pulse on the scan-inhibit lead setting the scan count flip flop to said second state to stop the clock;

wherein the input port module include interrupt means which is actuated in response to a pulse on the strobe lead of any of its pots set that port to an interrupt condition and to supply an interrupt signal via said bus to the processor, and to select one of the ports having the interrupt condition, means to receive data from said address data leads and the switch data lead of the port selected and to transmit the data via the bus to the processor, and means responsive to a subsequent ready signal condition from the processor via the bus for supplying a pulse on the ready lead of the selected port;

the scan count flip flop of the switch reader module being set to its first state in response to the pulse on the ready lead so that the clock scan gate is enabled to cause the clock to resume operation and the switch reader module continues scanning the swtich contacts from the next address.

2. Apparatus according to claim 1, wherein said coupling between the switch reader module and said one port further includes a preset lead, coupled in the switch reader module to the latch, to the clock, and to the address counter, the preset lead being coupled via the input port module and said bus, to receive preset signals from said processor, for resetting the the address counter to address zero, and also resetting the latch and the clock;

wherein said clock further includes a load lockout flip flop, a clock gate having one input coupled to said clock lead and another input from an output of the load lockout flip flop, a pre-load gate having one input coupled to said ready lead and another input from an output of the load lockout flip flop, a mixer gate having inputs from the clock gate and the pre-load gate and an output to said clock scan gate, so that the clock gate and the mixer gate form part of said coupling between said clock lead and the clock input of the clock counting means, the load lockout flip flop having one input coupled to the preset lead for setting it to a first state in response to a preset signal, and a second input to the load lockout flip flop from an N-count lead for setting it to a second state in response to an N-count pulse, the pre-load gate being enabled with the first state, and the clock gate being enabled with the second state, a lead coupled from the load lockout flip flop to the comparator to inhibit the comparator when the load lockout flip flop is in the first state;

wherein the switch reader module further includes an N-count detector having an input coupled to the address counter and an output to a N-count lead for generating a pulse on the N-count lead in response to the address counter reaching address N;

said apparatus having a LOAD mode in which the processor supplies said preset signal followed by 4N read signals, so that signals are supplied to the clock input of the clock to advance it 4N times, which causes the address counter to advance through the N addresses, with the load lockout flip flop set to its first state by the preset signal to enable the pre-load gate and inhibit the comparator, whereby the shift register is loaded with the current state for the N switch contacts, and upon reaching address N a signal is generated by the N-count detector which via the N-count lead sets the load lockout flip flop to its second state, whereby the pre-load gate is inhibited, and the clock gate and the comparator are enabled to place the switch reader module in a RUN mode.

3. Apparatus according to claim 2, wherein said input port module comprises a plurality of input units, each of which comprises a Z80 PIO parallel input-output integrated circuit chip for two of said ports, a port address circuit with inputs from manual address switches and from said bus for selecting an input unit, other address leads from the bus being connected in multiple to the input units to select one of the two ports of the selected input unit and a control or data mode, a transceiver for coupling data terminals of the input units to input or output data leads of the bus, and a plurality of gates coupled between the bus and the input units for interface control.

4. Apparatus according to claim 2, further including a test set which comprises a simulator switch, a switch test address circuit, test control circuits, and display circuits;

wherein the switch test address circuit includes address switch means for manually setting to any of the N addresses, test multiplex means having an input coupled to the simulator switch, test address inputs, and N outputs for coupling to said N inputs of the switch reader in place of the connections to switch contacts for test purposes, address conversion means coupled from the address switch means to the address inputs of the test multiplex means for enabling the test multiplex means to supply a signal corresponding to the state of the simulator switch at the one of its N outputs corresponding to the address set on the address switch means;

wherein the test control circuits include a preset switch coupled to inputs of a preset flip flop, a ready switch coupled to inputs of a ready flip flop, a run switch coupled to inputs of a run flip flop, a manual clock switch coupled to inputs of a manual clock flip flop, a clock oscillator with a manual rate control, a clock test lead, a manual/automatic switch having contacts for connecting the test clock lead to either an output of the manual clock flip flop or an output of the clock oscillator, a preset test lead coupled to an output of the preset flip flop, a preset test lead coupled via OR gate means to an output of the ready flip flop and also via a ready-automatic switch to the clock test lead, a run test lead coupled to an output of the run flip flop, the preset test lead, the ready test lead, and the clock lead being coupled respectively to the preset, ready and clock leads in place of the connection to said port for test purposes, the run test lead being coupled to a run lead of the switch reader circuit which is coupled to an input of the scan count flip flop for test purposes;

wherein the display circuits include an address display unit including code conversion means coupled to M display address leads for displaying any one of the numbers zero to N, a switch data indicator coupled to a switch-data display lead, four clock phase indicators coupled to four phase display display leads, a strobe indicator coupled via a strobe detector flip flop to a strobe display lead, and a switch-reader loaded indicator coupled to an output of a switch-reader loaded flip flop having a set input coupled to an N-count test lead and a reset input coupled to the preset test lead; the M display address leads, the switch-data display lead, the four phase display leads, the strobe display lead, and the N-count test lead being adapted for coupling to the M address data leads, the switch data lead, the strobe lead, and the N-count lead of the switch reader module for test purposes.

5. Apparatus according to claim 4, wherein said switch test address circuit includes meand coupling the address switch means to M port-test-address leads, means coupling the simulator switch to a port-test-switch-data lead, and means coupling the output of the manual clock flip flop to a port-test-strobe lead; the M port-test-address leads, the port-test-switch-data lead, and the port-test-strobe lead being adapted for coupling to the M address leads, the switch data lead, and the strobe lead at said one port for testing the input port module with the processor and the test set.

* * * * *

UNITED STATES PATENT AND TRADEMARK OFFICE
CERTIFICATE OF CORRECTION

PATENT NO. : 4,761,762

DATED : August 2, 1988

INVENTOR(S) : Buddy L. Holmes

It is certified that error appears in the above-identified patent and that said Letters Patent is hereby corrected as shown below:

On the Title Page, in the Abstract, line 16, replace "a", second occurrence, with --the--.

Col 2, line 31, replace "pot" with --port--.
Col 3, line 29, replace upper-case "O" with zero --0--.
Col 3, line 51, replace upper-case "O" with zero --0--.
Col 4, line 52, replace "shaft" with --shift--.
Col 6, line 28, replace "TT1" with --TTL--.
Col 7, line 33, replace "to" with --go--.
Col 7, line 51, replace "parts" with --ports--.
Col 8, line 18, after "control" insert --or--.
Col 8, line 29, replace "has" with --bus--.
Col 8, line 57, replace "aand" with --and--.
Col 8, line 67, replace "adn" with --and--.
Col 9, line 11, replace "L1" with --LG1--.
Col 9, line 19, replace "diagram" with --diagrams--.
Col 9, line 49, after "pulse" insert --also--.
Col 10, line 54, replace "latche" with --latch--.
Col 12, line 13, replace "128bit" with --128-bit--.
Col 12, line 43, replace "swtich" with --switch--.
Col 13, line 66, replace "new" with --now--.
Col 14, line 64, replace "ooutput" with --outputs--.

UNITED STATES PATENT AND TRADEMARK OFFICE
CERTIFICATE OF CORRECTION

PATENT NO. : 4,761,762
DATED : August 2, 1988
INVENTOR(S) : Buddy L. Holmes

It is certified that error appears in the above-identified patent and that said Letters Patent is hereby corrected as shown below:

```
Col 15, line 40, replace "input" with --inputs--.
Col 15, line 51, replace "Thef our" with --The four--.
Col 19, Claim 1, line 7, replace "pot" with --port--.
Col 20, Claim 1, line 21, replace "pots" with --ports--.
Col 22, Claim 4, line 10, replace "preset" with --ready--.

Col 22, Claim 5, line 2, replace "meand" with --means--.
```

Signed and Sealed this

Twenty-first Day of March, 1989

Attest:

DONALD J. QUIGG

*Attesting Officer*

*Commissioner of Patents and Trademarks*